US010656382B2

(12) United States Patent
Hsu et al.

(10) Patent No.: US 10,656,382 B2
(45) Date of Patent: May 19, 2020

(54) IMAGING LENS ASSEMBLY, IMAGE CAPTURING APPARATUS AND ELECTRONIC DEVICE

(71) Applicant: LARGAN PRECISION CO., LTD., Taichung (TW)

(72) Inventors: Po-Lun Hsu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 435 days.

(21) Appl. No.: 15/084,628

(22) Filed: Mar. 30, 2016

(65) Prior Publication Data

US 2017/0168266 A1 Jun. 15, 2017

(30) Foreign Application Priority Data

Dec. 15, 2015 (TW) ................ 104142066 A

(51) Int. Cl.
| | | |
|---|---|---|
| G02B 13/00 | (2006.01) | |
| G02B 9/60 | (2006.01) | |
| G02B 13/04 | (2006.01) | |
| G02B 27/00 | (2006.01) | |

(52) U.S. Cl.
CPC ........... *G02B 13/0045* (2013.01); *G02B 9/60* (2013.01); *G02B 13/04* (2013.01); *G02B 27/0025* (2013.01)

(58) Field of Classification Search
CPC ... G02B 9/60; G02B 13/0015; G02B 13/0045
USPC ................ 359/659, 714, 754, 761, 763, 770
See application file for complete search history.

(56) References Cited

U.S. PATENT DOCUMENTS

| | | | |
|---|---|---|---|
| 8,477,432 B2 | 7/2013 | Huang et al. | |
| 8,649,113 B1 | 2/2014 | Tsai et al. | |
| 8,767,298 B2 | 7/2014 | Suzuki et al. | |
| 9,075,221 B2 | 7/2015 | Hsu et al. | |
| 9,134,511 B2 | 9/2015 | Hashimoto et al. | |
| 9,223,114 B2* | 12/2015 | Tsai .................. | G02B 13/0045 |
| 2013/0279020 A1* | 10/2013 | Noda ....................... | G02B 3/04 359/708 |
| 2014/0029117 A1* | 1/2014 | Noda ................. | G02B 13/0045 359/714 |

(Continued)

FOREIGN PATENT DOCUMENTS

| | | |
|---|---|---|
| CN | 203606559 U | 5/2014 |
| CN | 104166220 A | 11/2014 |

(Continued)

*Primary Examiner* — Travis S Fissel
(74) *Attorney, Agent, or Firm* — Locke Lord LLP; Tim Tingkang Xia, Esq.

(57) ABSTRACT

An imaging lens assembly, including, in order from an object side to an image side: a first lens element having negative refractive power; a second lens element with positive refractive power having an image-side surface being convex; a third lens element, a fourth lens element with positive refractive power having an object-side surface being concave and an image-side surface being convex; a fifth lens element with negative refractive power having an image-side surface being concave, at least one convex shape on the image-side surface in an off-axial region, and both of object-side and image-side surfaces thereof being aspheric; wherein the imaging lens assembly has a total of five lens elements.

26 Claims, 24 Drawing Sheets

(56) References Cited

U.S. PATENT DOCUMENTS

| | | | |
|---|---|---|---|
| 2014/0085735 A1* | 3/2014 | Shih | G02B 13/0045 359/714 |
| 2015/0098137 A1* | 4/2015 | Chung | G02B 13/0045 359/714 |
| 2015/0103225 A1 | 4/2015 | Hsu et al. | |
| 2015/0205069 A1 | 7/2015 | Jung et al. | |
| 2015/0219879 A1* | 8/2015 | Zhao | G02B 13/0045 348/335 |
| 2016/0065812 A1* | 3/2016 | Jo | H04N 5/2254 348/340 |
| 2016/0091696 A1* | 3/2016 | Lin | G02B 13/18 359/714 |
| 2016/0170178 A1* | 6/2016 | Tang | G02B 13/0045 348/360 |

FOREIGN PATENT DOCUMENTS

| | | |
|---|---|---|
| CN | 204009194 U | 12/2014 |
| JP | 2010-8562 A | 1/2010 |
| JP | 2012-211935 A | 11/2012 |
| TW | 201235694 A1 | 9/2012 |
| TW | I485425 B | 5/2015 |
| TW | 103138532 A | 6/2015 |

\* cited by examiner

IMAGING LENS ASSEMBLY, IMAGE CAPTURING APPARATUS AND ELECTRONIC DEVICE

RELATED APPLICATIONS

This application claims priority to Taiwan Application Serial Number 104142066, filed on Dec. 15, 2015, which is incorporated by reference herein in its entirety.

BACKGROUND

Technical Field

The present disclosure relates to an imaging lens assembly and an image capturing apparatus, and more particularly, to an imaging lens assembly and an image capturing apparatus applicable to electronic devices.

Description of Related Art

In addition to applications in mobile devices, modern photographing modules have a wide range of applications. Utilizing photographing modules in various intelligent electronic products, such as vehicle devices and intelligent household appliances, has become a trend in current technological developments. As more and more devices and apparatuses, such as mobile phones, tablet computers, optical recognition devices, rear view cameras and driving recording systems, have been equipped with photographing modules in order to extend the range of applications, there is an increasing demand for lens systems with high image quality.

With the miniaturization and diversification of electronic devices, the lens systems equipped in these devices have been configured to wide angles of view and large apertures. However, the prior art lens systems are usually unable to concurrently meet the requirements of wide angles of view and short total track lengths because of the configuration thereof. Additionally, the excessive stray light renders the image quality unsatisfactory, and would be limiting the range of applications.

SUMMARY

According to one aspect of the present disclosure, an imaging lens assembly, comprises, in order from an object side to an image side: a first lens element having negative refractive power; a second lens element with positive refractive power having an image-side surface being convex thereof a third lens element; a fourth lens element with positive refractive power having an object-side surface being concave and an image-side surface being convex thereof and a fifth lens element with negative refractive power having an image-side surface being concave, at least one convex shape on the image-side surface in an off-axial region, and both of object-side and the image-side surfaces thereof being aspheric; wherein the imaging lens assembly has a total of five lens elements, an axial distance between the first lens element and the second lens element is the largest among respective axial distances between every two adjacent lens elements of the first lens element, the second lens element, the third lens element, the fourth lens element, and the fifth lens element; wherein a focal length of the first lens element is f1, a focal length of the third lens element is f3, a curvature radius of an object-side surface of the second lens element is R3, a curvature radius of the image-side surface of the second lens element is R4, a curvature radius of an object-side surface of the first lens element is R1, a curvature radius of an image-side surface of the first lens element is R2, and the following conditions are satisfied:

$-2.40 < f1/|f3| < 0;$ $-0.25 < (R3+R4)/(R3-R4);$ $2.30 < |R1/R2|.$

According to another aspect of the present disclosure, an imaging lens assembly, comprises, in order from an object side to an image side: a first lens element having negative refractive power; a second lens element with positive refractive power having an image-side surface being convex thereof; a third lens element having an object-side surface being convex thereof; a fourth lens element with positive refractive power having an object-side surface being concave and an image-side surface being convex thereof; and a fifth lens element with negative refractive power having an image-side surface being concave, at least one convex shape on the image-side surface in an off-axial region, and both of object-side and the image-side surfaces thereof being aspheric; wherein the imaging lens assembly has a total of five lens elements; wherein a focal length of the first lens element is f1, a focal length of the third lens element is f3, a curvature radius of an object-side surface of the first lens element is R1, a curvature radius of an image-side surface of the first lens element is R2, and the following conditions are satisfied:

$-2.40 < f1/|f3| < 0;$ $2.30 < |R1/R2|.$

According to still another aspect of the present disclosure, an image capturing apparatus includes the aforementioned imaging lens assembly and an image sensor.

According to yet another aspect of the present disclosure, an electronic device includes the aforementioned image capturing apparatus.

DETAILED DESCRIPTION

Figure 1A:
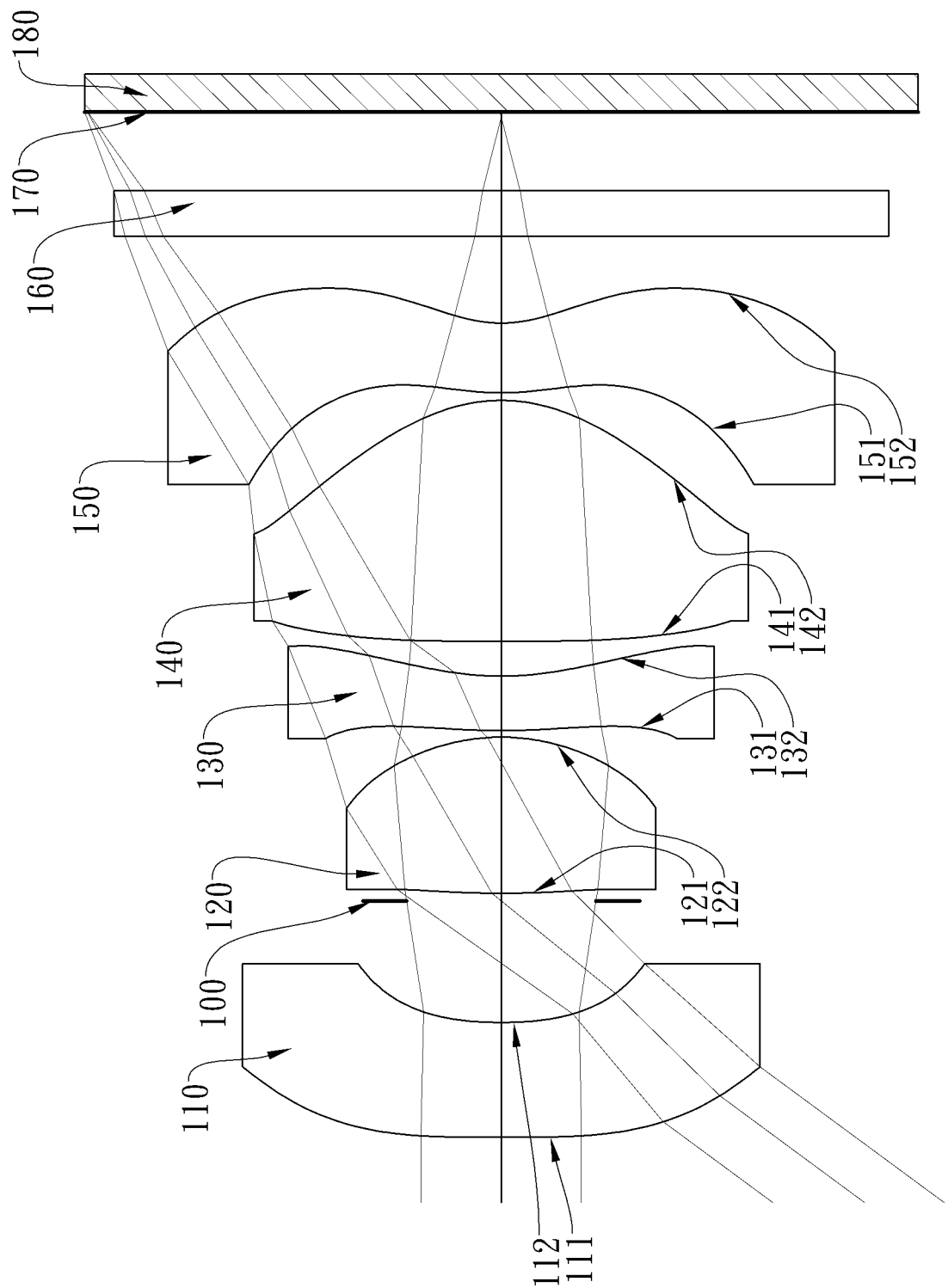
FIG. 1A is a schematic view of an image capturing apparatus according to the 1st embodiment of the present disclosure.

The present disclosure provides an imaging lens assembly including, in order from an object side to an image side, a first lens element, a second lens element, a third lens element, a fourth lens element, and a fifth lens element.

The first lens element has negative refractive power so as to facilitate the imaging lens assembly with a wider field of view.

The second lens element with positive refractive power has an image-side surface being convex thereof. The configuration of the first lens element and the second lens element may further facilitate the entrance of light to the imaging lens assembly at a larger incident angle.

The third lens element may have an object-side surface being convex and an image-side surface being concave thereof and each of the surfaces of the third lens element may have at least one inflection point so as to correct aberrations in paraxial and off-axial regions.

The fourth lens element with positive refractive power has an object-side surface being concave and an image-side surface being convex thereof so as to facilitate light convergence and image formation.

The fifth lens element with negative refractive power has an image-side surface being concave, at least one convex shape on the image-side surface in an off-axial region, and both of object-side and the image-side surfaces thereof being aspheric. The configuration of the fourth lens element and the fifth lens element favorably enables light convergence on an image surface and thereby to provide a shorter back focal length for miniaturization of the imaging lens assembly. The fifth lens element may have an object-side surface being convex thereof so as to further correct aberrations.

The imaging lens assembly has a total of five lens elements, and an axial distance between the first lens element and the second lens element is the largest among respective axial distances between every two adjacent lens elements of the first lens element, the second lens element, the third lens element, the fourth lens element, and the fifth lens element so as to strengthen the imaging lens assembly's capability to capture light at a wider field of view When a focal length of the first lens element is f1, a focal length of the third lens element is f3, and the following condition is satisfied: $-2.40<f1/|f3|<0$, it is favorable for distributing the negative refractive power of the imaging lens assembly and for reducing aberrations while maintaining a wider field of view. Preferably, the following condition can be satisfied: $-1.40<f1/|f3|<0$. More preferably, the following condition can be satisfied: $-1.10<f1/|f3|<0$.

When a curvature radius of an object-side surface of the second lens element is R3, a curvature radius of the image-side surface of the second lens element is R4, and the following condition can be satisfied: $-0.25<(R3+R4)/(R3-R4)$, a principal point of the second lens element can be shifted toward the image side so as to favorably enlarge the field of view of the imaging lens assembly. Preferably, the following condition can be satisfied: $0.0<(R3+R4)/(R3-R4)<2.0$.

When a curvature radius of an object-side surface of the first lens element is R1, a curvature radius of an image-side surface of the first lens element is R2, and the following condition is satisfied: $2.30<|R1/R2|$, problems resulted from an excessively curved shape of the first negative lens element, such as the low mechanical rigidity of the lens element, the excessive optical sensitivity, or high surface reflections, can be prevented. Preferably, the following condition can be satisfied: $4.0<|R1/R2|$.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions can be satisfied: $1.25<T12/(T23+T34+T45)<5.0$, the space utilization efficiency of the imaging lens assembly can be further improved to reduce the size of the imaging lens assembly.

When a curvature radius of the object-side surface of the third lens element is R5, a curvature radius of the image-side surface of the third lens element is R6, and the following condition can be satisfied: $1.50<(R5+R6)/(R5-R6)$, the principal point of the third lens element can be shifted toward the image side so that the field of view of the imaging lens assembly can be favorably enlarged and the field curvature can be corrected to improve the image quality.

When a distance in parallel with an optical axis from an axial vertex on the object-side surface of the fourth lens element to a maximum effective diameter position on the object-side surface of the fourth lens element is Sag41, a central thickness of the fourth lens element is CT4, and the following condition can be satisfied: |Sag41|/CT4<0.15, the variation in the shape of the fourth lens element can be mitigated and the stray light resulted from surface reflections can be reduced.

When a focal length of the first lens element is f1, a focal length of the second lens element is f2, a focal length of the third lens element is f3, and the following condition can be satisfied: f3<f1<f2, the total track length of the imaging lens assembly can be shortened and the field of view can be favorably enlarged so that the imaging lens assembly features a compact size and a wide field of view.

When an Abbe number of the fifth lens element is V5, and the following condition can be satisfied: 10<V5<32, a balance between the astigmatism and chromatic aberration can be attained.

When a vertical distance between a maximum effective diameter position on the image-side surface of the fifth lens element and the optical axis is Y52, a focal length of the imaging lens assembly is f, and the following condition can be satisfied: 0.80<Y52/f, the relative illumination can be increased or maintained under the configuration of a wide field of view, thereby increasing the resolution in a peripheral region. Preferably, the following condition can be satisfied: 0.85<Y52/f.

When a vertical distance between a maximum effective diameter position on the object-side surface of the first lens element and the optical axis is Y11, a vertical distance between a maximum effective diameter position on the image-side surface of the fifth lens element and the optical axis is Y52, and the following condition can be satisfied: 0.55<Y11/Y52<1.20, the size difference between the first lens element and the fifth lens element can be reduced, and this is favorable for assembling as well as the miniaturization of the imaging lens assembly When the focal length of the first lens element is f1, a focal length of the imaging lens assembly is f, and the following condition can be satisfied: −3.5<f1/f<0, the first lens element can provide a more appropriate negative refractive power.

According to the imaging lens assembly of the present disclosure, the lens elements thereof can be made of glass or plastic material. When the lens elements are made of glass material, the distribution of the refractive power of the imaging lens assembly may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required number of lens elements, the total track length of the imaging lens assembly can be effectively reduced.

According to the imaging lens assembly of the present disclosure, the imaging lens assembly can include at least one stop, such as an aperture stop, a glare stop or a field stop, so as to favorably reduce the amount of stray light and thereby to improve the image quality.

According to the imaging lens assembly of the present disclosure, an aperture stop can be configured as a front stop or a middle stop. A front stop disposed between an imaged object and the first lens element can provide a longer distance between an exit pupil of the imaging lens assembly and the image surface, so that the generated telecentric effect can improve the image-sensing efficiency of an image sensor, such as a CCD or CMOS sensor. A middle stop disposed between the first lens element and the image surface is favorable for enlarging the field of view of the imaging lens assembly, and thereby to provide a wide field of view for the same.

According to the imaging lens assembly of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the imaging lens assembly of the present disclosure, the image surface of the imaging lens assembly, based on the corresponding image sensor, can be a plane or a curved surface with any curvature, especially a curved surface being concave facing towards the object side.

The imaging lens assembly of the present disclosure can be optionally applied to moving focus optical systems. According to the imaging lens assembly of the present disclosure, the imaging lens assembly features a good correction capability and high image quality, and can be applied to 3D (three-dimensional) image capturing applications and electronic devices, such as digital cameras, mobile devices, smartphones, digital tablets, smart TVs, network surveillance devices, motion sensing input devices, driving recording systems, rear view camera systems, drone cameras and wearable devices.

According to the present disclosure, an image capturing apparatus includes the aforementioned imaging lens assembly and an image sensor, wherein the image sensor is disposed on or near an image surface of the imaging lens assembly. Therefore, the design of the imaging lens assembly enables the image capturing apparatus to achieve the best image quality. Preferably, the imaging lens assembly can further include a barrel member, a holder member or a combination thereof.

Referring to FIG. 11A, FIG. 11B, FIG. 11C and FIG. 11D, an image capturing apparatus 1101 may be installed in an electronic device including, but not limited to, a rear view camera 1110, a driving recording system 1120, a surveillance camera 1130, or a smartphone 1140. The four exemplary figures of different electronic devices are only exemplary for showing the image capturing apparatus of the present disclosure installed in an electronic device, and the present disclosure is not limited thereto. Preferably, the electronic device can further include a control unit, a display unit, a storage unit, a random access memory unit (RAM) or a combination thereof.

According to the above description of the present disclosure, the following 1st-10th specific embodiments are provided for further explanations.

1st Embodiment

Figure 1B:
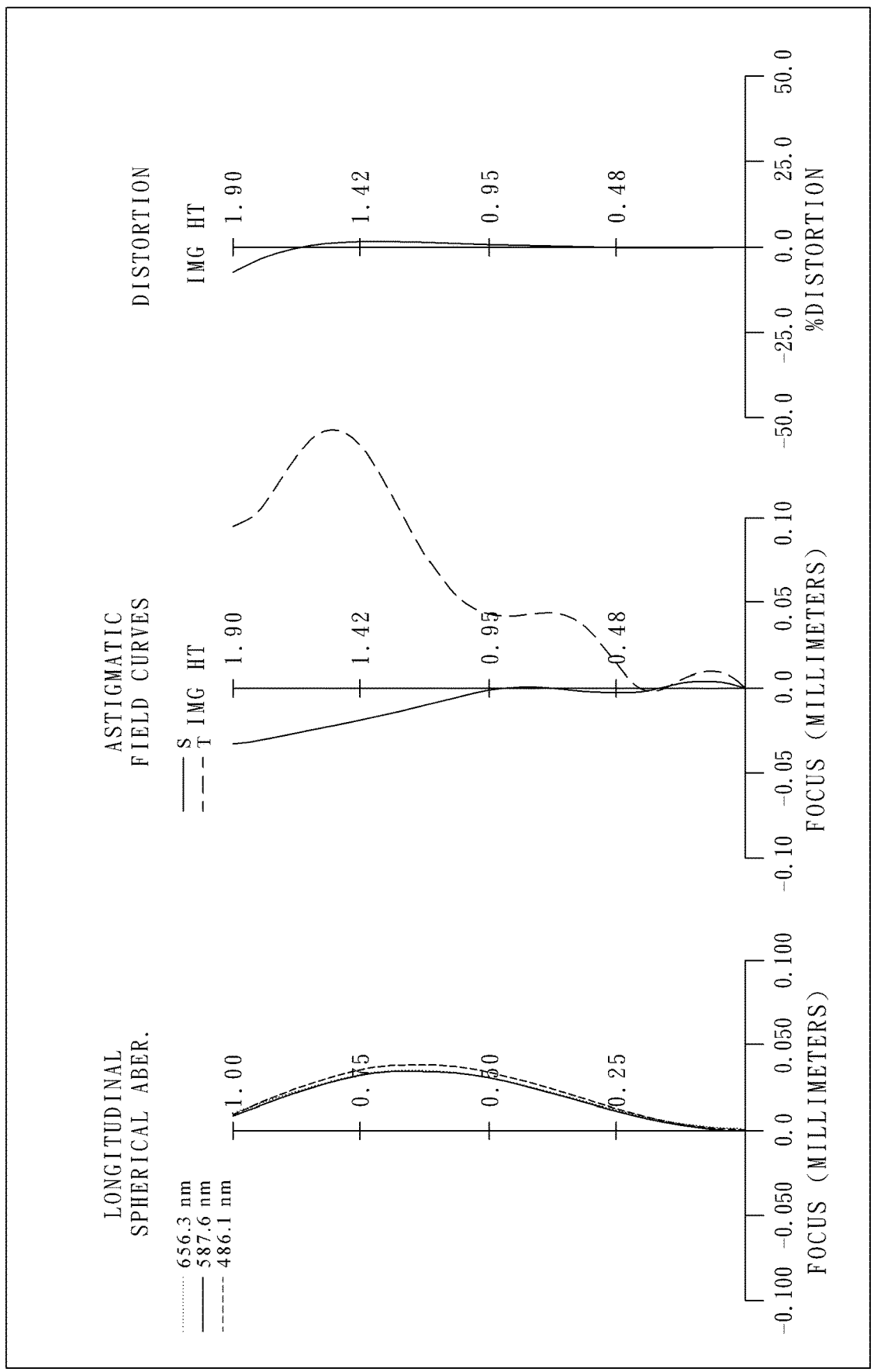
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus includes an imaging lens assembly (not otherwise herein labeled) of the present disclosure and an image sensor 180. The imaging lens assembly includes, in order from an object side to an image side, a first lens element 110, an aperture stop 100, a second lens element 120, a third lens element 130, a fourth lens element 140, and a fifth lens element 150.

The first lens element 110 with negative refractive power has an object-side surface 111 being convex in a paraxial region thereof and an image-side surface 112 being concave in a paraxial region thereof, which are both aspheric, and the first lens element 110 is made of plastic material.

The second lens element 120 with positive refractive power has an object-side surface 121 being convex in a paraxial region thereof and an image-side surface 122 being convex in a paraxial region thereof, which are both aspheric, and the second lens element 120 is made of plastic material.

The third lens element 130 with negative refractive power has an object-side surface 131 being convex in a paraxial region thereof and an image-side surface 132 being concave in a paraxial region thereof, which are both aspheric and each of the two surfaces has at least one inflection point. The third lens element 130 is made of plastic material.

The fourth lens element 140 with positive refractive power has an object-side surface 141 being concave in a paraxial region thereof and an image-side surface 142 being convex in a paraxial region thereof, which are both aspheric, and the fourth lens element 140 is made of plastic material.

The fifth lens element 150 with negative refractive power has an object-side surface 151 being convex in a paraxial region thereof and an image-side surface 152 being concave in a paraxial region thereof, which are both aspheric and the fifth lens element 150 is made of plastic material.

The imaging lens assembly further includes an IR cut filter 160 located between the fifth lens element 150 and an image surface 170. The IR cut filter 160 is made of glass material and will not affect the focal length of the imaging lens assembly. The image sensor 180 is disposed on or near the image surface 170 of the imaging lens assembly.

The detailed optical data of the 1st embodiment are shown in TABLE 1, and the aspheric surface data are shown in TABLE 2, wherein the units of the curvature radius, the thickness and the focal length are expressed in mm, and HFOV is a half of the maximal field of view.

TABLE 1

(1st Embodiment)
$f = 1.51$ mm, Fno = 2.05, HFOV = 53.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 26.440 | ASP | 0.528 | Plastic | 1.544 | 56.0 | −3.34 |
| 2 | | 1.687 | ASP | 0.559 | | | | |
| 3 | Ape. Stop | Plano | | 0.035 | | | | |
| 4 | Lens 2 | 4.433 | ASP | 0.718 | Plastic | 1.544 | 56.0 | 1.53 |
| 5 | | −0.966 | ASP | 0.030 | | | | |
| 6 | Lens 3 | 2.899 | ASP | 0.250 | Plastic | 1.660 | 20.4 | −4.04 |
| 7 | | 1.341 | ASP | 0.161 | | | | |
| 8 | Lens 4 | −82.165 | ASP | 1.107 | Plastic | 1.544 | 56.0 | 1.44 |
| 9 | | −0.782 | ASP | 0.035 | | | | |
| 10 | Lens 5 | 1.193 | ASP | 0.320 | Plastic | 1.660 | 20.4 | −2.03 |
| 11 | | 0.564 | ASP | 0.400 | | | | |
| 12 | IR Cut Filter | Plano | | 0.210 | Glass | 1.517 | 64.2 | — |
| 13 | | Plano | | 0.360 | | | | |
| 14 | Image Surface | Plano | | — | | | | |

Note:
Reference wavelength is d-line 587.6 nm

TABLE 2

Aspheric Coefficients

| Surface # | 1 | 2 | 4 | 5 | 6 |
|---|---|---|---|---|---|
| k = | −9.0000E+01 | −7.9054E+00 | −1.6984E+01 | −1.8483E+00 | −4.4591E+01 |
| A4 = | 2.7889E−01 | 8.7801E−01 | −2.7662E−02 | −1.9978E−01 | −2.9165E−01 |
| A6 = | −2.0466E−01 | −4.4075E−01 | −5.3521E−01 | 2.7142E−01 | 3.8186E−01 |
| A8 = | 1.4844E−01 | 1.0292E+00 | 1.5938E+00 | −1.9106E+00 | −6.7685E−01 |
| A10 = | −5.8969E−02 | | −5.8842E+00 | 3.3692E+00 | 4.1697E−01 |
| A12 = | 7.6045E−03 | | | −3.7057E+00 | −2.3713E−01 |

| Surface # | 7 | 8 | 9 | 10 | 11 |
|---|---|---|---|---|---|
| k = | −5.6444E+00 | −8.8543E+01 | −1.4101E+00 | −1.5074E+01 | −4.1486E+00 |
| A4 = | −2.3033E−01 | 2.5626E−01 | −2.8162E−01 | −7.6094E−01 | −6.7171E−01 |
| A6 = | 3.4341E−01 | −6.1306E−01 | 1.8935E+00 | 6.7423E−01 | 7.7357E−01 |
| A8 = | −3.6834E−01 | 1.0614E+00 | −5.3484E+00 | −5.7212E−01 | −5.8093E−01 |
| A10 = | 1.7266E−01 | −1.0921E+00 | 8.3381E+00 | 5.9595E−01 | 2.8904E−01 |
| A12 = | −4.2467E−02 | 6.1182E−01 | −7.3425E+00 | −5.3249E−01 | −9.4106E−02 |
| A14 = | | −1.4104E−01 | 3.4194E+00 | 2.3629E−01 | 1.7761E−02 |
| A16 = | | | −6.4937E−01 | −3.7446E−02 | −1.4443E−03 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the imaging lens assembly is f, an f-number of the imaging lens assembly is Fno, a half of a maximal field of view of the imaging lens assembly is HFOV, and these parameters have the following values: f=1.51 mm; Fno=2.05; and HFOV=53.5 degrees.

In the 1st embodiment, an Abbe number of the fifth lens element 150 is V5, and it satisfies the condition: V5=20.4.

In the 1st embodiment, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and they satisfy the condition: T12/(T23+T34+T45)=2.63.

In the 1st embodiment, a curvature radius of an object-side surface 111 of the first lens element 110 is R1, a curvature radius of an image-side surface 112 of the first lens element 110 is R2, and they satisfy the condition: |R1/R2|=15.67.

In the 1st embodiment, a curvature radius of an object-side surface 121 of the second lens element 120 is R3, a curvature radius of the image-side surface 122 of the second lens element 120 is R4, and they satisfy the condition: (R3+R4)/(R3−R4)=0.64.

In the 1st embodiment, a curvature radius of the object-side surface 131 of the third lens element 130 is R5, a curvature radius of the image-side surface 132 of the third lens element 130 is R6, and they satisfy the condition: (R5+R6)/(R5−R6)=2.72.

In the 1st embodiment, a distance in parallel with the optical axis from an axial vertex on the object-side surface 141 of the fourth lens element 140 to a maximum effective diameter position on the object-side surface 141 of the fourth lens element 140 is Sag41, a central thickness of the fourth lens element 140 is CT4, and they satisfy the condition: |Sag41|/CT4=0.08.

In the 1st embodiment, a vertical distance between a maximum effective diameter position on the object-side surface 111 of the first lens element 110 and the optical axis is Y11, a vertical distance between a maximum effective diameter position on the image-side surface 152 of the fifth lens element 150 and the optical axis is Y52, and they satisfy the condition: Y11/Y52=0.78.

In the 1st embodiment, the vertical distance between the maximum effective diameter position on the image-side surface 152 of the fifth lens element 150 and the optical axis is Y52, a focal length of the imaging lens assembly is f, and they satisfy the condition: Y52/f=1.01.

In the 1st embodiment, a focal length of the first lens element 110 is f1, a focal length of the third lens element 130 is f3, and they satisfy the condition: f1/|f3|=−0.83.

In the 1st embodiment, the focal length of the first lens element 110 is f1, the focal length of the imaging lens assembly is f, and they satisfy the condition: f1/f=−2.21.

2nd Embodiment

Figure 2A:
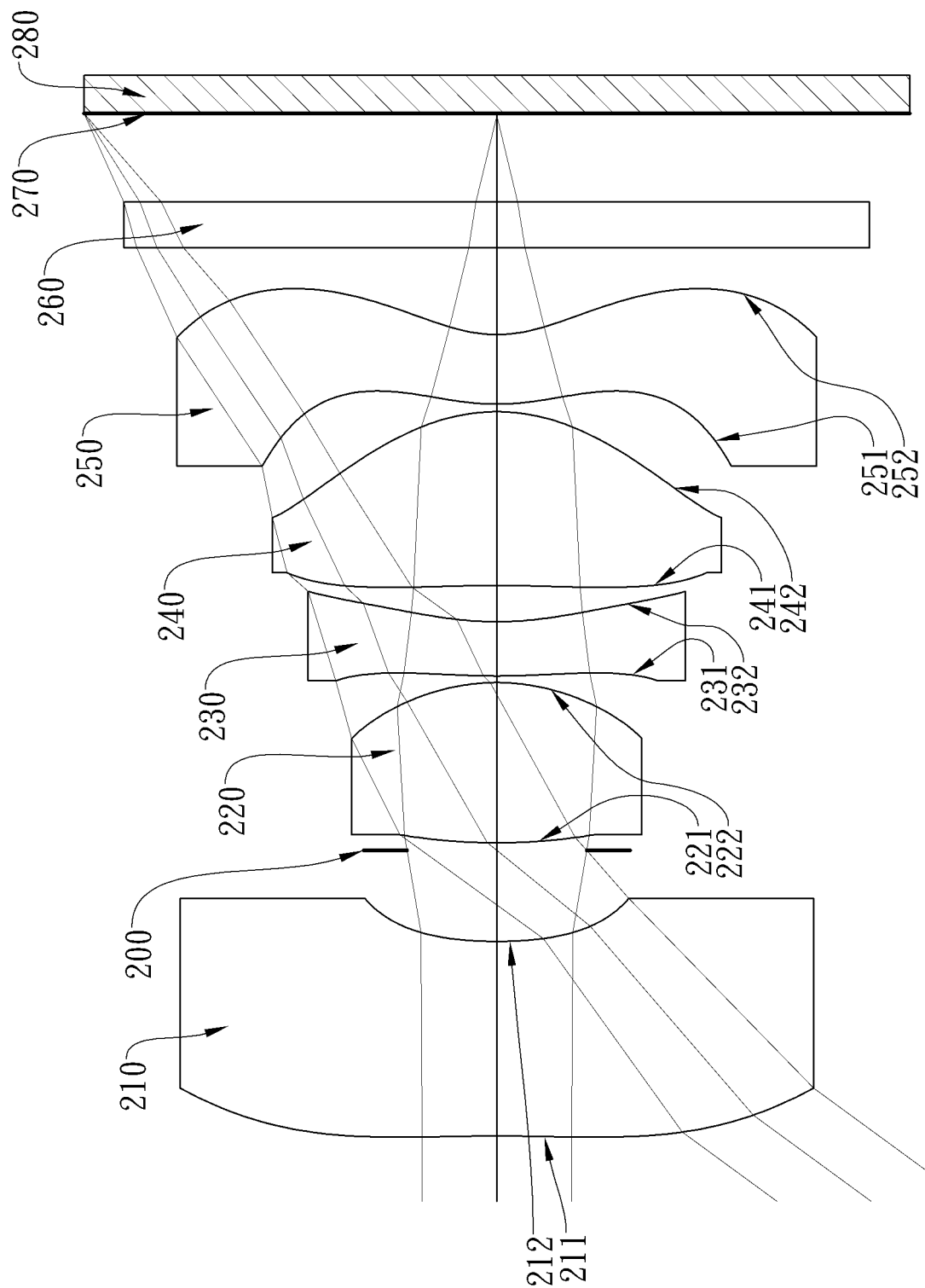
FIG. 2A is a schematic view of an image capturing apparatus according to the 2nd embodiment of the present disclosure.
Figure 2B:
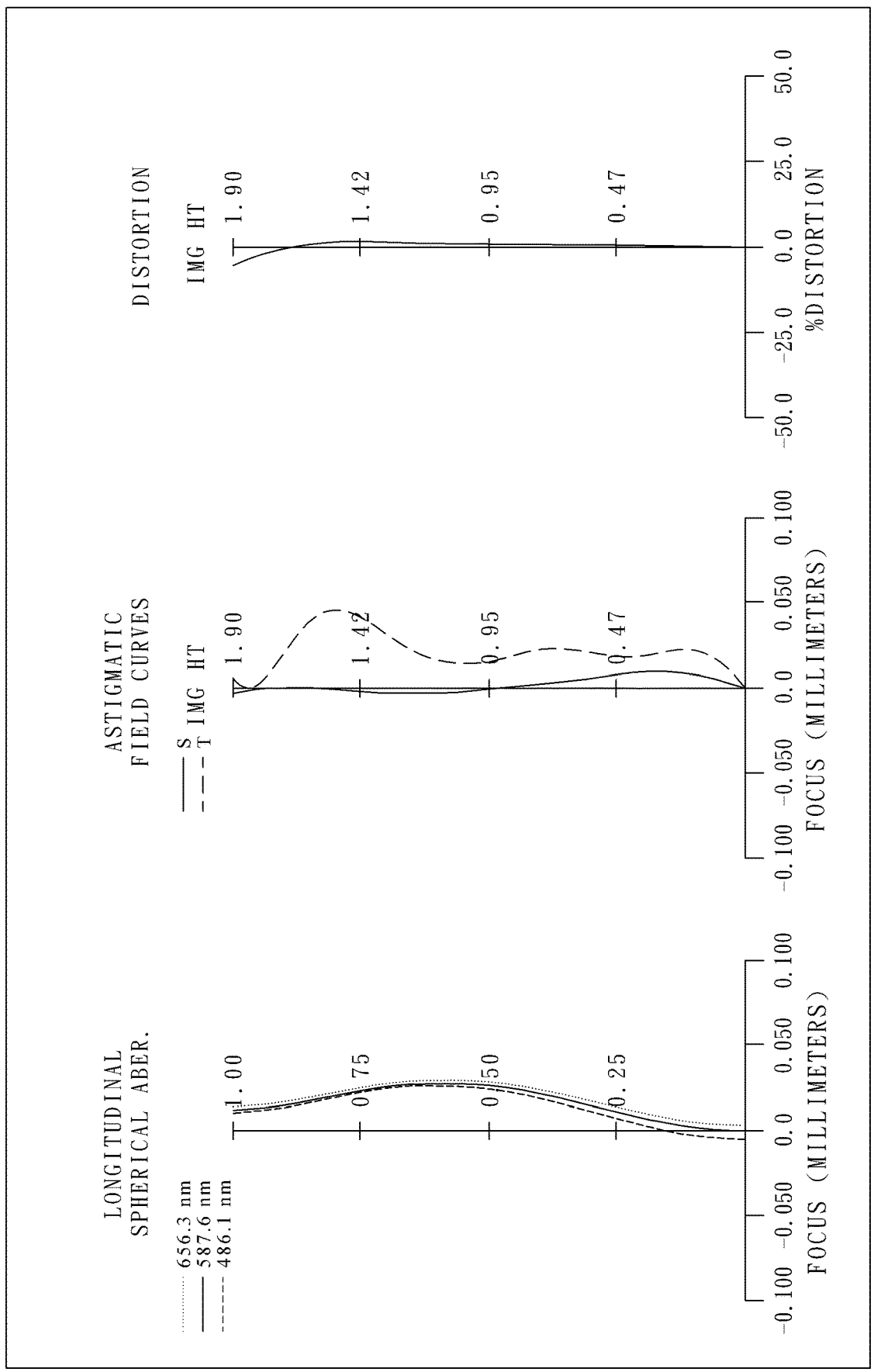
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus includes an imaging lens assembly (not otherwise herein labeled) of the present disclosure and an image sensor 280. The imaging lens assembly includes, in order from an object side to an image side, a first lens element 210, an aperture stop 200, a second lens element 220, a third lens element 230, a fourth lens element 240, and a fifth lens element 250.

The first lens element 210 with negative refractive power has an object-side surface 211 being concave in a paraxial region thereof and an image-side surface 212 being concave in a paraxial region thereof, which are both aspheric, and the first lens element 210 is made of plastic material.

The second lens element 220 with positive refractive power has an object-side surface 221 being convex in a paraxial region thereof and an image-side surface 222 being convex in a paraxial region thereof, which are both aspheric, and the second lens element 220 is made of plastic material.

The third lens element 230 with negative refractive power has an object-side surface 231 being convex in a paraxial region thereof and an image-side surface 232 being concave in a paraxial region thereof, which are both aspheric. The third lens element 230 is made of plastic material and has at least one inflection point on the object-side surface 231.

The fourth lens element 240 with positive refractive power has an object-side surface 241 being concave in a paraxial region thereof and an image-side surface 242 being convex in a paraxial region thereof, which are both aspheric, and the fourth lens element 240 is made of plastic material.

The fifth lens element 250 with negative refractive power has an object-side surface 251 being convex in a paraxial region thereof and an image-side surface 252 being concave in a paraxial region thereof, which are both aspheric, and the fifth lens element 250 is made of plastic material.

The imaging lens assembly further includes an IR cut filter 260 located between the fifth lens element 250 and an image surface 270. The IR cut filter 260 is made of glass material and will not affect the focal length of the imaging lens assembly. The image sensor 280 is disposed on or near the image surface 270 of the imaging lens assembly.

The detailed optical data of the 2nd embodiment are shown in TABLE 3, and the aspheric surface data are shown in TABLE 4, wherein the units of the curvature radius, the thickness and the focal length are expressed in mm, and HFOV is a half of the maximal field of view.

TABLE 3

(2nd Embodiment)
f = 1.46 mm, Fno = 2.12, HFOV = 53.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −9.759 | ASP | 0.896 | Plastic | 1.544 | 56.0 | −2.78 |
| 2 | | 1.847 | ASP | 0.419 | | | | |
| 3 | Ape. Stop | Plano | | 0.035 | | | | |
| 4 | Lens 2 | 2.625 | ASP | 0.738 | Plastic | 1.544 | 56.0 | 1.42 |
| 5 | | −0.982 | ASP | 0.030 | | | | |
| 6 | Lens 3 | 3.176 | ASP | 0.250 | Plastic | 1.660 | 20.4 | −4.34 |
| 7 | | 1.459 | ASP | 0.167 | | | | |
| 8 | Lens 4 | −5.714 | ASP | 0.800 | Plastic | 1.544 | 56.0 | 1.81 |
| 9 | | −0.881 | ASP | 0.035 | | | | |
| 10 | Lens 5 | 1.030 | ASP | 0.320 | Plastic | 1.660 | 20.4 | −3.03 |
| 11 | | 0.596 | ASP | 0.400 | | | | |
| 12 | IR Cut Filter | Plano | | 0.210 | Glass | 1.517 | 64.2 | — |
| 13 | | Plano | | 0.409 | | | | |
| 14 | Image Surface | Plano | | — | | | | |

Note:
Reference wavelength is d-line 587.6 nm
The effective radius in Surface 10 is 1.080 mm

TABLE 4

| Aspheric Coefficients | | | | | |
|---|---|---|---|---|---|
| Surface # | 1 | 2 | 4 | 5 | 6 |
| k = | −2.9334E+01 | −2.0930E+01 | −3.3480E+00 | −1.5934E+00 | −8.5556E+01 |
| A4 = | 1.4099E−01 | 9.2215E−01 | 3.2594E−02 | −1.8603E−01 | −2.5976E−01 |
| A6 = | −7.2155E−02 | −6.4899E−01 | −1.2951E−01 | 4.4494E−01 | 1.3052E−01 |
| A8 = | 3.1438E−02 | 1.2200E+00 | 3.3507E−02 | −1.9114E+00 | −9.4941E−02 |
| A10 = | −7.4187E−03 | 1.6144E+00 | −2.0409E+00 | 3.3163E+00 | −1.6961E−02 |
| A12 = | 5.6619E−04 | | | −3.7057E+00 | −2.3713E−01 |

| Surface # | 7 | 8 | 9 | 10 | 11 |
|---|---|---|---|---|---|
| k = | −6.8696E+00 | −8.9574E+01 | −1.0581E+00 | −9.5240E+00 | −3.5854E+00 |
| A4 = | −2.5246E−01 | 2.5335E−01 | −3.0011E−01 | −5.6466E−01 | −5.0933E−01 |
| A6 = | 3.6467E−01 | −5.7296E−01 | 2.0066E+00 | 4.7747E−01 | 5.9459E−01 |
| A8 = | −3.2032E−01 | 1.0938E+00 | −5.4267E+00 | −6.3737E−01 | −5.1218E−01 |
| A10 = | 2.0884E−01 | −1.1109E+00 | 8.3773E+00 | 6.5367E−01 | 2.8429E−01 |
| A12 = | −4.2467E−02 | 6.1183E−01 | −7.3425E+00 | −5.3248E−01 | −9.7106E−02 |
| A14 = | | −1.4104E−01 | 3.4194E+00 | 2.3629E−01 | 1.8027E−02 |
| A16 = | | | −6.4937E−01 | −3.7447E−02 | −1.3708E−03 |

In the 2nd embodiment, the equation of the aspheric surface profiles of the aforementioned lens elements is the same as the equation of the 1st embodiment. Also, the definitions of these parameters shown in TABLE 5 below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in TABLE 5.

TABLE 5

| 2nd Embodiment | | | |
|---|---|---|---|
| f [mm] | 1.46 | (R5 + R6)/(R5 − R6) | 2.70 |
| Fno | 2.12 | |Sag41|/CT4 | 0.07 |
| HFOV [deg.] | 53.8 | Y11/Y52 | 0.99 |
| V5 | 20.4 | Y52/f | 1.01 |
| T12/(T23 + T34 + T45) | 1.96 | f1/|f3| | −0.64 |
| |R1/R2| | 5.28 | f1/f | −1.90 |
| (R3 + R4)/(R3 − R4) | 0.46 | | |

3rd Embodiment

Figure 3A:
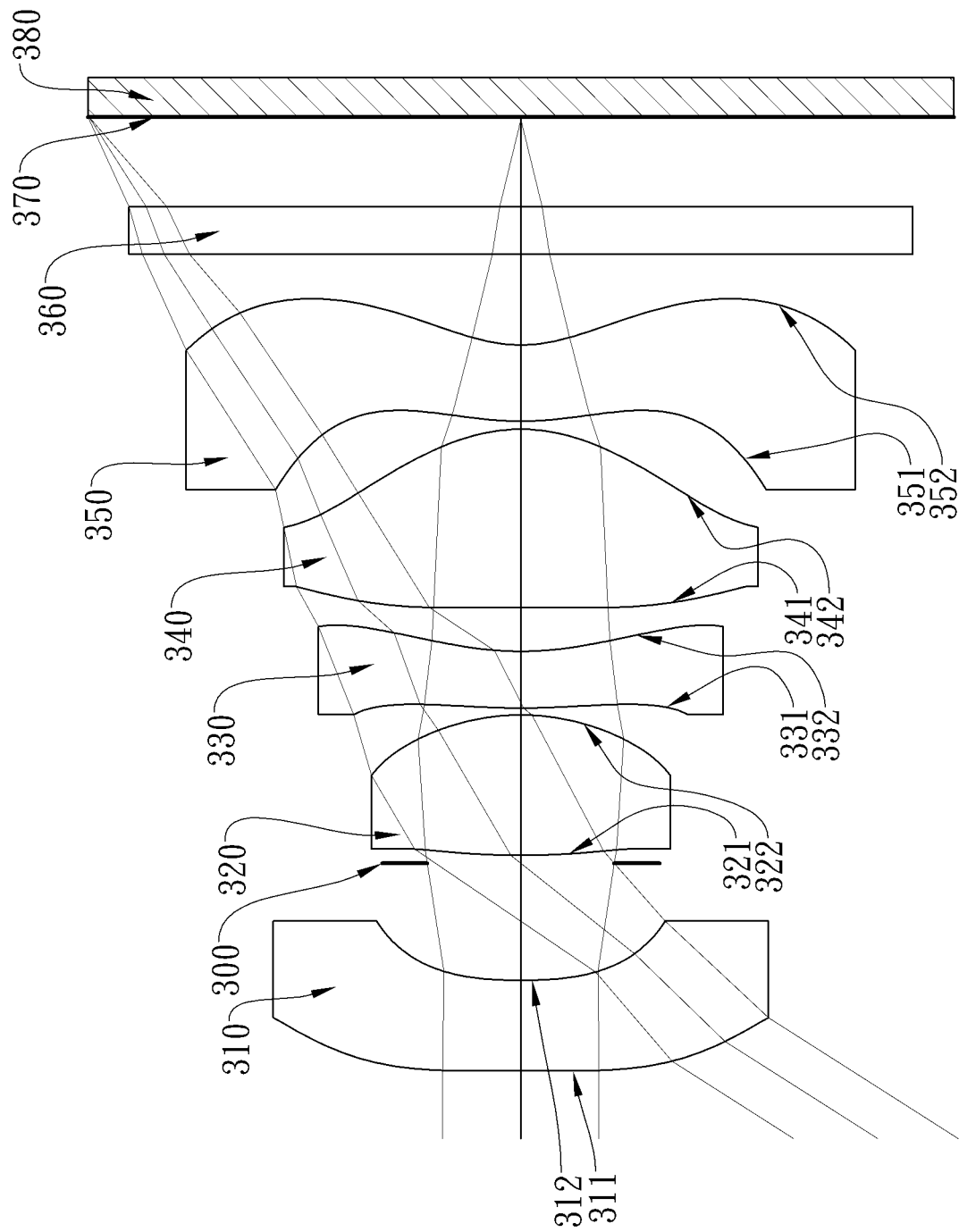
FIG. 3A is a schematic view of an image capturing apparatus according to the 3rd embodiment of the present disclosure.
Figure 3B:
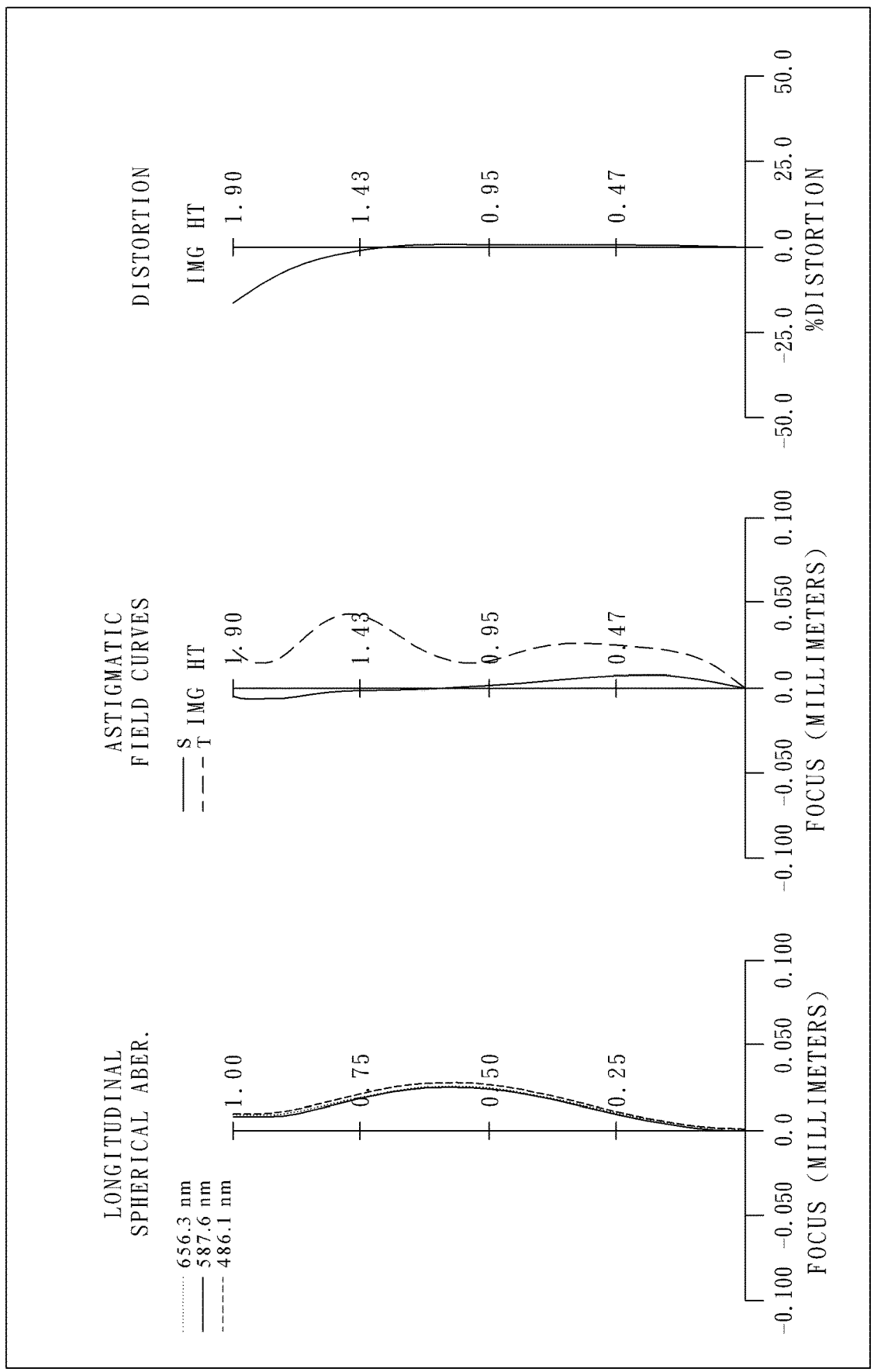
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus includes an imaging lens assembly (not otherwise herein labeled) of the present disclosure and an image sensor 380. The imaging lens assembly includes, in order from an object side to an image side, a first lens element 310, an aperture stop 300, a second lens element 320, a third lens element 330, a fourth lens element 340, and a fifth lens element 350.

The first lens element 310 with negative refractive power has an object-side surface 311 being concave in a paraxial region thereof and an image-side surface 312 being concave in a paraxial region thereof, which are both aspheric, and the first lens element 310 is made of plastic material.

The second lens element 320 with positive refractive power has an object-side surface 321 being convex in a paraxial region thereof and an image-side surface 322 being convex in a paraxial region thereof, which are both aspheric, and the second lens element 320 is made of plastic material.

The third lens element 330 with negative refractive power has an object-side surface 331 being convex in a paraxial region thereof and an image-side surface 332 being concave in a paraxial region thereof, which are both aspheric, and each of the two surfaces has at least one inflection point. The third lens element 330 is made of plastic material.

The fourth lens element 340 with positive refractive power has an object-side surface 341 being concave in a paraxial region thereof and an image-side surface 342 being convex in a paraxial region thereof, which are both aspheric, and the fourth lens element 340 is made of plastic material.

The fifth lens element 350 with negative refractive power has an object-side surface 351 being convex in a paraxial region thereof and an image-side surface 352 being concave in a paraxial region thereof, which are both aspheric, and the fifth lens element 350 is made of plastic material.

The imaging lens assembly further includes an IR cut filter 360 located between the fifth lens element 350 and an image surface 370. The IR cut filter 360 is made of glass material and will not affect the focal length of the imaging lens assembly. The image sensor 380 is disposed on or near the image surface 370 of the imaging lens assembly.

The detailed optical data of the 3rd embodiment are shown in TABLE 6, and the aspheric surface data are shown in TABLE 7, wherein the units of the curvature radius, the thickness and the focal length are expressed in mm, and HFOV is a half of the maximal field of view.

TABLE 6

(3rd Embodiment)
f = 1.46 mm, Fno = 2.12, HFOV = 57.5 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −11.930 | ASP | 0.397 | Plastic | 1.544 | 56.0 | −3.11 |
| 2 |  | 1.992 | ASP | 0.516 |  |  |  |  |
| 3 | Ape. Stop | Plano |  | 0.035 |  |  |  |  |
| 4 | Lens 2 | 3.318 | ASP | 0.619 | Plastic | 1.544 | 56.0 | 1.47 |
| 5 |  | −0.981 | ASP | 0.030 |  |  |  |  |
| 6 | Lens 3 | 3.130 | ASP | 0.250 | Plastic | 1.660 | 20.4 | −3.81 |
| 7 |  | 1.350 | ASP | 0.194 |  |  |  |  |
| 8 | Lens 4 | −9.476 | ASP | 0.785 | Plastic | 1.544 | 56.0 | 1.44 |
| 9 |  | −0.744 | ASP | 0.035 |  |  |  |  |
| 10 | Lens 5 | 1.314 | ASP | 0.336 | Plastic | 1.660 | 20.4 | −2.18 |
| 11 |  | 0.617 | ASP | 0.400 |  |  |  |  |
| 12 | IR Cut Filter | Plano |  | 0.210 | Glass | 1.517 | 64.2 | — |
| 13 |  | Plano |  | 0.394 |  |  |  |  |
| 14 | Image Surface | Plano |  | — |  |  |  |  |

Note:
Reference wavelength is d-line 587.6 nm
The effective radius in Surface 10 is 1.080 mm

TABLE 7

Aspheric Coefficients

| Surface # | 1 | 2 | 4 | 5 | 6 |
|---|---|---|---|---|---|
| k = | −2.9334E+01 | −2.0928E+01 | −7.6661E+00 | −3.4777E+00 | −5.2651E+01 |
| A4 = | 4.5275E−01 | 1.2116E+00 | 3.0189E−03 | −2.6047E−01 | −2.1669E−01 |
| A6 = | −4.9023E−01 | −1.1514E+00 | −2.9923E−01 | −4.9312E−01 | −3.3934E−01 |
| A8 = | 4.6095E−01 | 2.5537E+00 | 9.3064E−01 | 1.5298E+00 | 1.2844E+00 |
| A10 = | −2.4855E−01 | −1.5437E−01 | −6.2229E+00 | −1.8275E+00 | −1.6054E+00 |
| A12 = | 4.7442E−02 |  |  | −3.7057E+00 | −2.3713E−01 |

| Surface # | 7 | 8 | 9 | 10 | 11 |
|---|---|---|---|---|---|
| k = | −3.5602E+00 | −9.0000E+01 | −4.1852E+00 | −1.2995E+01 | −4.1282E+00 |
| A4 = | −3.2535E−01 | 3.7159E−01 | −6.3446E−01 | −4.1358E−01 | −4.0884E+00 |
| A6 = | 3.8124E−01 | −6.1809E−01 | 2.1594E+00 | 1.4647E−01 | 4.3010E+00 |
| A8 = | −3.4997E−01 | 9.7450E−01 | −5.2248E+00 | −3.8470E−01 | −3.8501E+00 |
| A10 = | 1.0557E−01 | −1.0609E+00 | 8.2241E+00 | 6.0003E−01 | 2.3939E+00 |
| A12 = | −4.2467E−02 | 6.1182E−01 | −7.3425E+00 | −5.3247E−01 | −9.5912E+00 |
| A14 = |  | −1.4104E−01 | 3.4194E+00 | 2.3628E−01 | 2.1461E+00 |
| A16 = |  |  | −6.4937E−01 | −3.7447E−02 | −1.9971E+00 |

In the 3rd embodiment, the equation of the aspheric surface profiles of the aforementioned lens elements is the same as the equation of the 1st embodiment. Also, the definitions of these parameters shown in TABLE 8 below are the same as those stated in the 1st embodiment with corresponding values for the 3rd embodiment, so an explanation in this regard will not be provided again.

Moreover, these parameters can be calculated from TABLE 6 and TABLE 7 and satisfy the conditions stated in TABLE 8.

TABLE 8

3rd Embodiment

| | | | |
|---|---|---|---|
| f [mm] | 1.46 | (R5 + R6)/(R5 − R6) | 2.52 |
| Fno | 2.12 | |Sag41|/CT4 | 0.12 |
| HFOV [deg.] | 57.5 | Y11/Y52 | 0.74 |
| V5 | 20.4 | Y52/f | 1.01 |
| T12/(T23 + T34 + T45) | 2.13 | f1/|f3| | −0.82 |
| |R1/R2| | 5.99 | f1/f | −2.13 |
| (R3 + R4)/(R3 − R4) | 0.54 | | |

4th Embodiment

Figure 4A:
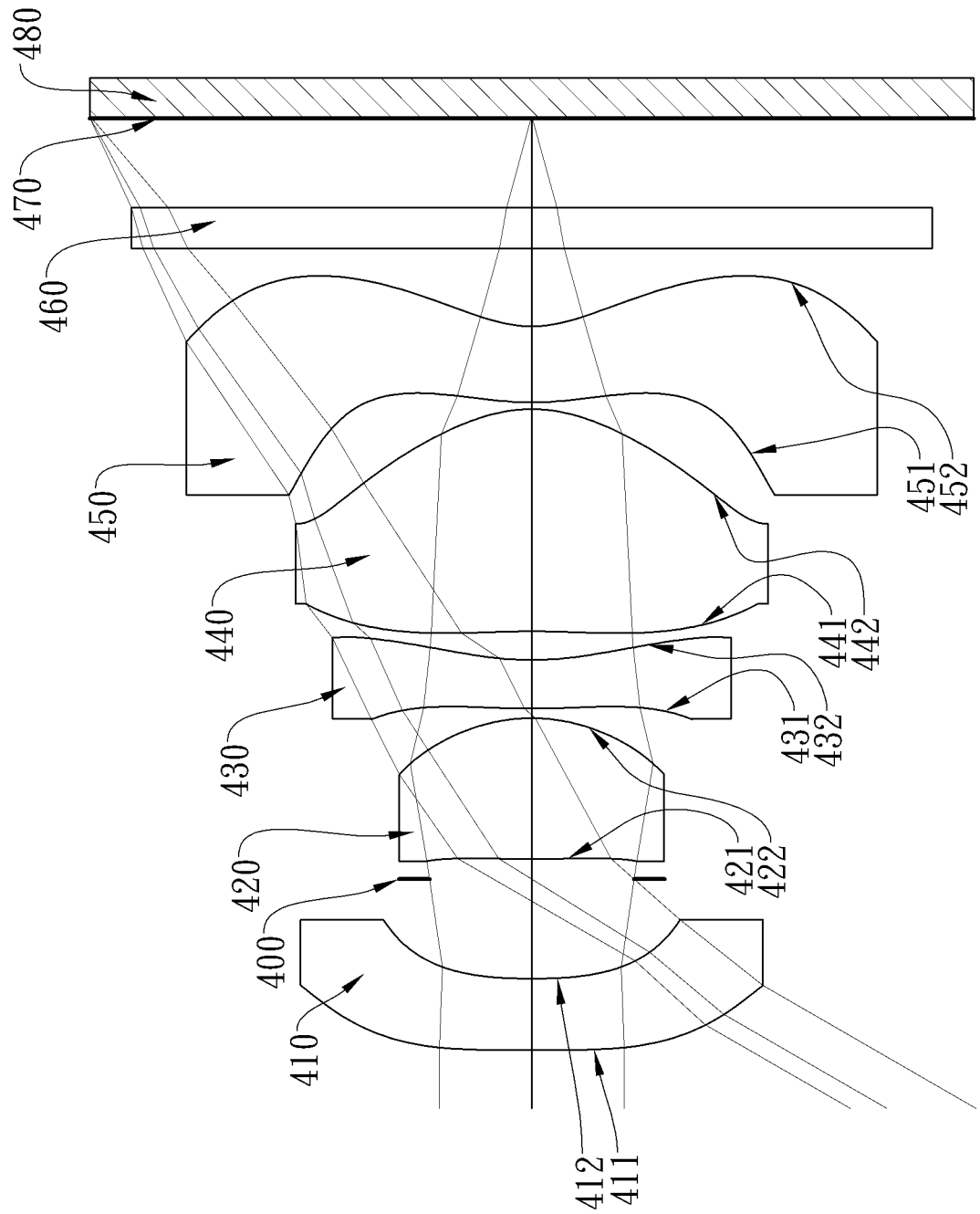
FIG. 4A is a schematic view of an image capturing apparatus according to the 4th embodiment of the present disclosure.
Figure 4B:
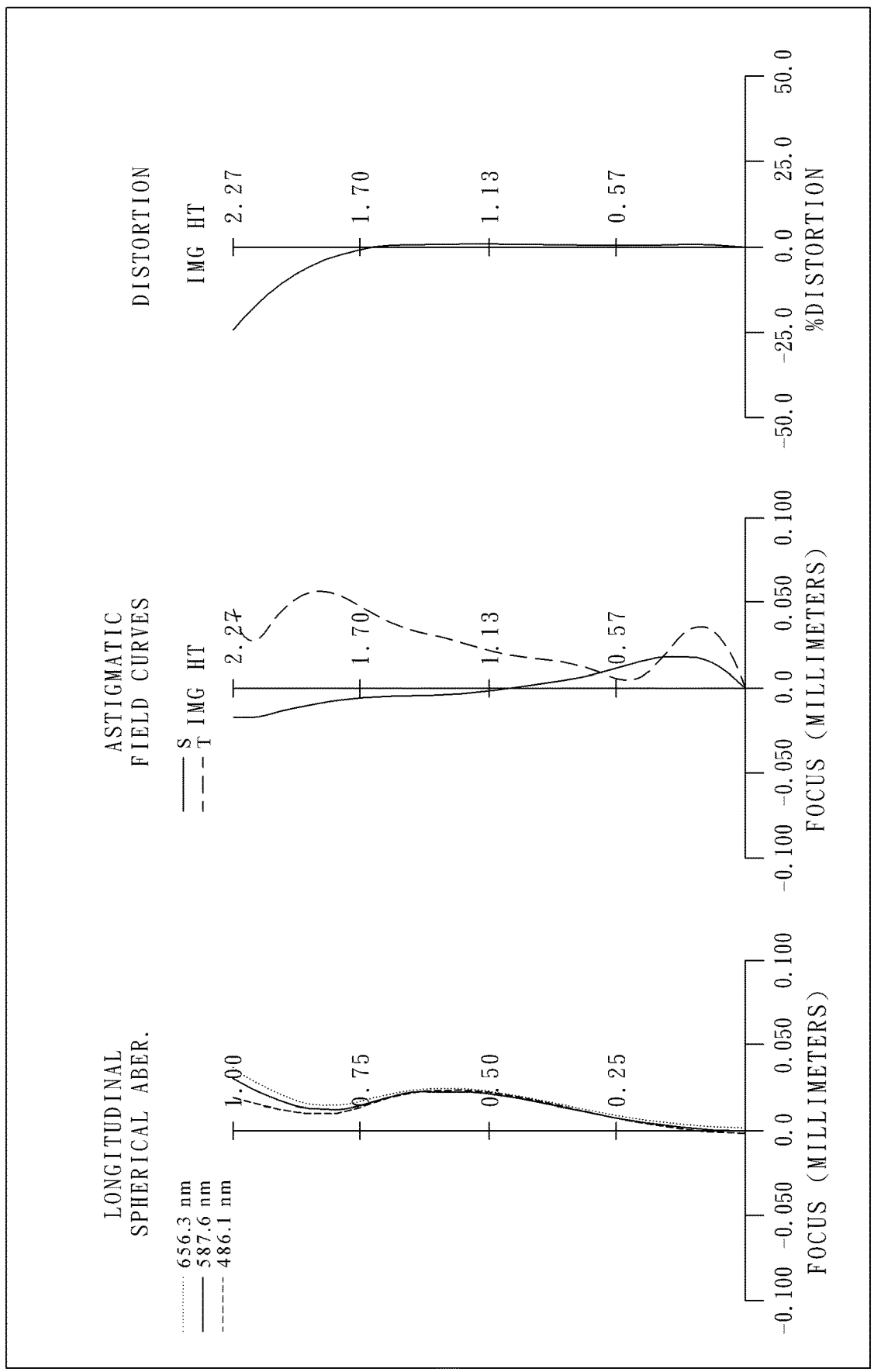
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus includes an imaging lens assembly (not otherwise herein labeled) of the present disclosure and an image sensor 480. The imaging lens assembly includes, in order from an object side to an image side, a first lens element 410, an aperture stop 400, a second lens element 420, a third lens element 430, a fourth lens element 440, and a fifth lens element 450.

The first lens element 410 with negative refractive power has an object-side surface 411 being convex in a paraxial region thereof and an image-side surface 412 being concave in a paraxial region thereof, which are both aspheric, and the first lens element 410 is made of plastic material.

The second lens element 420 with positive refractive power has an object-side surface 421 being convex in a paraxial region thereof and an image-side surface 422 being convex in a paraxial region thereof, which are both aspheric, and the second lens element 420 is made of plastic material.

The third lens element 430 with negative refractive power has an object-side surface 431 being convex in a paraxial region thereof and an image-side surface 432 being concave in a paraxial region thereof, which are both aspheric, and each of the two surfaces has at least one inflection point. The third lens element 430 is made of plastic material.

The fourth lens element 440 with positive refractive power has an object-side surface 441 being concave in a paraxial region thereof and an image-side surface 442 being convex in a paraxial region thereof, which are both aspheric, and the fourth lens element 440 is made of plastic material.

The fifth lens element 450 with negative refractive power has an object-side surface 451 being convex in a paraxial region thereof and an image-side surface 452 being concave in a paraxial region thereof, which are both aspheric, and the fifth lens element 450 is made of plastic material.

The imaging lens assembly further includes an IR cut filter 460 located between the fifth lens element 450 and an image surface 470. The IR cut filter 460 is made of glass material and will not affect the focal length of the imaging lens assembly. The image sensor 480 is disposed on or near the image surface 470 of the imaging lens assembly.

The detailed optical data of the 4th embodiment are shown in TABLE 9, and the aspheric surface data are shown in TABLE 10, wherein the units of the curvature radius, the thickness and the focal length are expressed in mm, and HFOV is a half of the maximal field of view.

TABLE 9

(4th Embodiment)
f = 1.75 mm, Fno = 1.85, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 200.000 | ASP | 0.367 | Plastic | 1.544 | 55.9 | −4.96 |
| 2 | | 2.663 | ASP | 0.512 | | | | |
| 3 | Ape. Stop | Plano | | 0.104 | | | | |
| 4 | Lens 2 | 14.597 | ASP | 0.724 | Plastic | 1.544 | 55.9 | 1.59 |
| 5 | | −0.901 | ASP | 0.049 | | | | |
| 6 | Lens 3 | 3.875 | ASP | 0.250 | Plastic | 1.639 | 23.5 | −4.11 |
| 7 | | 1.526 | ASP | 0.147 | | | | |
| 8 | Lens 4 | −4.437 | ASP | 1.143 | Plastic | 1.544 | 55.9 | 1.51 |
| 9 | | −0.755 | ASP | 0.035 | | | | |
| 10 | Lens 5 | 1.498 | ASP | 0.391 | Plastic | 1.639 | 23.5 | −1.83 |
| 11 | | 0.590 | ASP | 0.400 | | | | |
| 12 | IR Cut Filter | Plano | | 0.210 | Glass | 1.517 | 64.2 | — |
| 13 | | Plano | | 0.459 | | | | |
| 14 | Image Surface | Plano | | — | | | | |

Note:
Reference wavelength is d-line 587.6 nm
The effective radius in Surface 5 is 0.680 mm

TABLE 10

| Aspheric Coefficients | | | | | |
|---|---|---|---|---|---|
| Surface # | 1 | 2 | 4 | 5 | 6 |
| k = | −1.1602E+00 | −6.8903E+01 | 1.2096E+00 | −1.8219E+00 | −8.9569E+01 |
| A4 = | 2.7768E−01 | 8.3188E−01 | −1.0257E−01 | −1.8528E−01 | −3.3259E−01 |
| A6 = | −1.3422E−01 | −7.2126E−01 | −5.6891E−01 | 3.5899E−01 | 3.9418E−01 |
| A8 = | 3.8516E−02 | 8.9792E−01 | 2.0216E+00 | −2.3418E+00 | −6.8567E−01 |
| A10 = | 2.6098E−02 | | −6.3317E+00 | 4.2621E+00 | 6.1826E−01 |
| A12 = | −1.8463E−02 | | | −3.7057E+00 | −2.3713E−01 |

| Surface # | 7 | 8 | 9 | 10 | 11 |
|---|---|---|---|---|---|
| k = | −5.8740E+00 | −9.9441E+01 | −2.1959E+00 | −2.8160E+01 | −4.7226E+00 |
| A4 = | −2.7088E−01 | 3.1797E−01 | 9.3190E−02 | −1.3181E−01 | −2.2961E−01 |
| A6 = | 3.4970E−01 | −5.2232E−01 | −1.8010E−01 | −2.8051E−01 | 1.8672E−01 |
| A8 = | −3.0887E−01 | 7.0353E−01 | −4.4214E−01 | 4.2547E−01 | −1.2784E−01 |
| A10 = | 1.5120E−01 | −5.6905E−01 | 3.9470E−01 | −3.8302E−01 | 5.6680E−02 |
| A12 = | −4.2467E−02 | 2.5136E−01 | −5.0735E−01 | 1.0337E−01 | −1.5753E−02 |
| A14 = | | −4.6200E−02 | 3.0536E−01 | 2.9562E−02 | 2.4263E−03 |
| A16 = | | | −6.8176E−02 | −1.1972E−02 | −1.5262E−04 |

In the 4th embodiment, the equation of the aspheric surface profiles of the aforementioned lens elements is the same as the equation of the 1st embodiment. Also, the definitions of these parameters shown in TABLE 11 below are the same as those stated in the 1st embodiment with corresponding values for the 4th embodiment, so an explanation in this regard will not be provided again.

Moreover, these parameters can be calculated from TABLE 9 and TABLE 10 and satisfy the conditions stated in TABLE 11.

TABLE 11

| 4th Embodiment | | | |
|---|---|---|---|
| f [mm] | 1.75 | (R5 + R6)/(R5 − R6) | 2.30 |
| Fno | 1.85 | \|Sag41\|/CT4 | 0.12 |
| HFOV [deg.] | 60.0 | Y11/Y52 | 0.67 |
| V5 | 23.5 | Y52/f | 1.01 |
| T12/(T23 + T34 + T45) | 2.67 | f1/\|f3\| | −1.21 |
| \|R1/R2\| | 75.09 | f1/f | −2.83 |
| (R3 + R4)/(R3 − R4) | 0.88 | | |

5th Embodiment

Figure 5A:
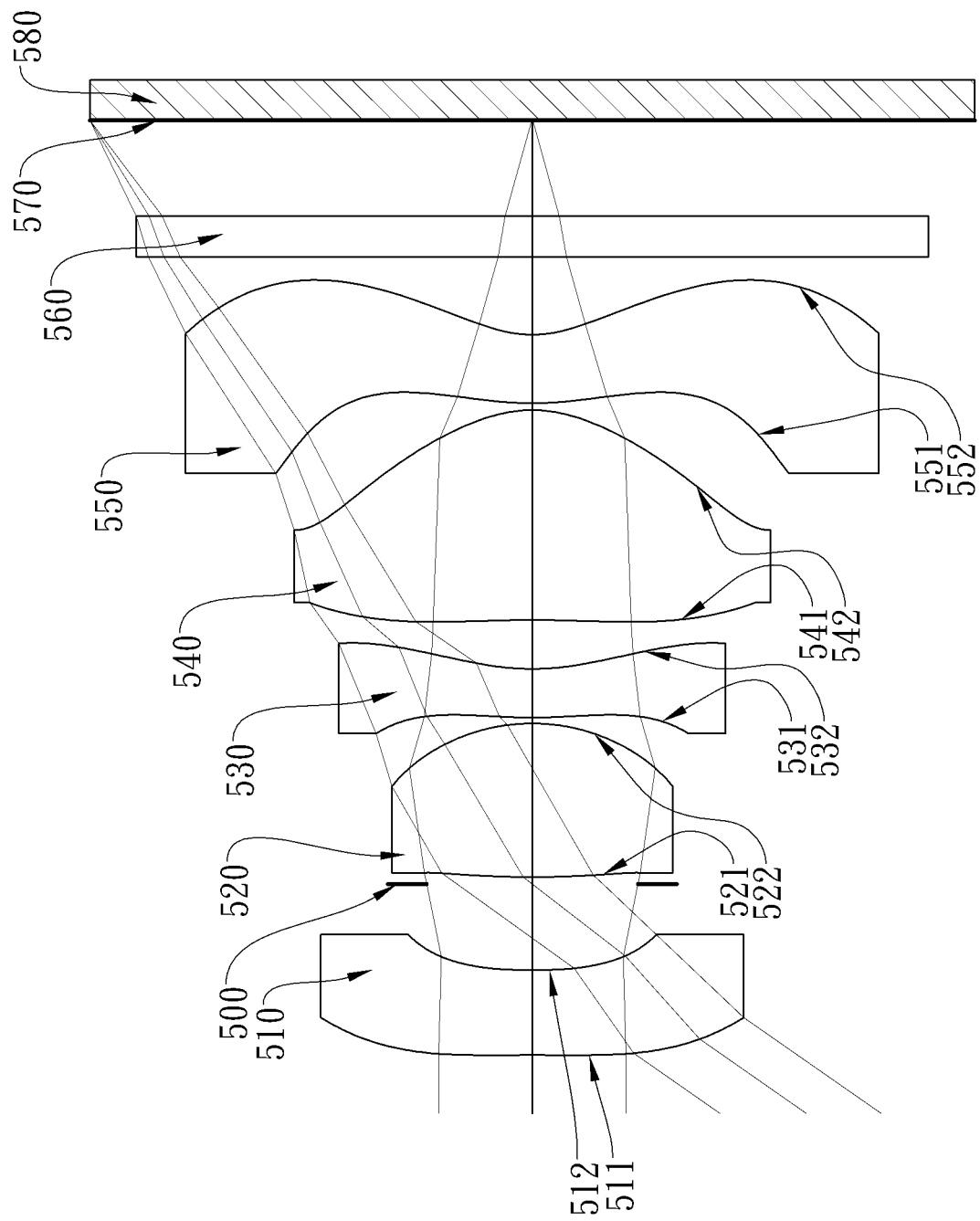
FIG. 5A is a schematic view of an image capturing apparatus according to the 5th embodiment of the present disclosure.
Figure 5B:
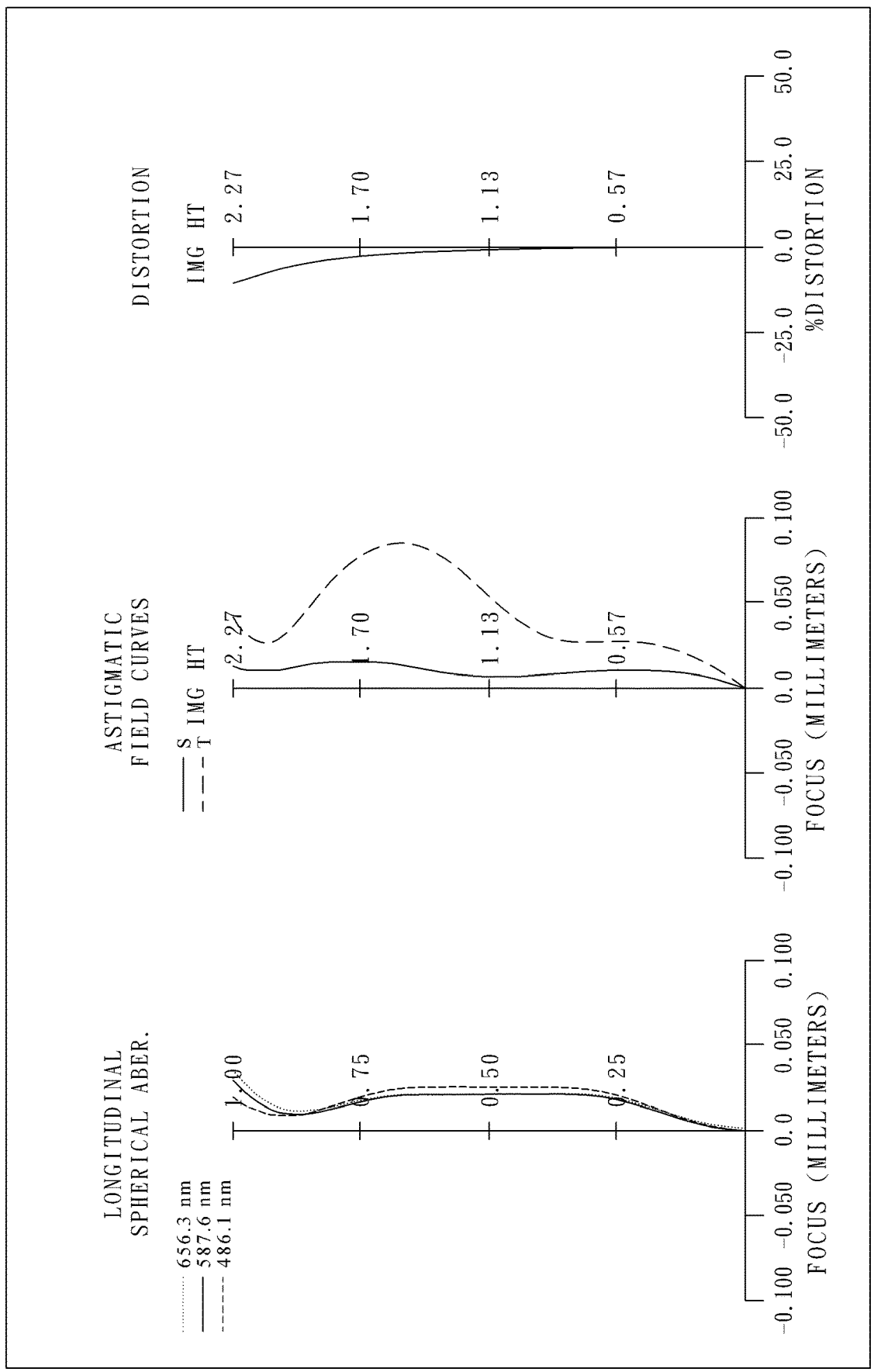
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus includes an imaging lens assembly (not otherwise herein labeled) of the present disclosure and an image sensor 580. The imaging lens assembly includes, in order from an object side to an image side, a first lens element 510, an aperture stop 500, a second lens element 520, a third lens element 530, a fourth lens element 540, and a fifth lens element 550.

The first lens element 510 with negative refractive power has an object-side surface 511 being concave in a paraxial region thereof and an image-side surface 512 being concave in a paraxial region thereof, which are both aspheric, and the first lens element 510 is made of plastic material.

The second lens element 520 with positive refractive power has an object-side surface 521 being convex in a paraxial region thereof and an image-side surface 522 being convex in a paraxial region thereof, which are both aspheric, and the second lens element 520 is made of plastic material.

The third lens element 530 with negative refractive power has an object-side surface 531 being convex in a paraxial region thereof and an image-side surface 532 being concave in a paraxial region thereof, which are both aspheric, and each of the two surfaces has at least one inflection point. The third lens element 530 is made of plastic material.

The fourth lens element 540 with positive refractive power has an object-side surface 541 being concave in a paraxial region thereof and an image-side surface 542 being convex in a paraxial region thereof, which are both aspheric, and the fourth lens element 540 is made of plastic material.

The fifth lens element 550 with negative refractive power has an object-side surface 551 being convex in a paraxial region thereof and an image-side surface 552 being concave in a paraxial region thereof, which are both aspheric, and the fifth lens element 550 is made of plastic material.

The imaging lens assembly further includes an IR cut filter 560 located between the fifth lens element 550 and an image surface 570. The IR cut filter 560 is made of glass material and will not affect the focal length of the imaging lens assembly. The image sensor 580 is disposed on or near the image surface 570 of the imaging lens assembly.

The detailed optical data of the 5th embodiment are shown in TABLE 12, and the aspheric surface data are shown in TABLE 13, wherein the units of the curvature radius, the thickness and the focal length are expressed in mm, and HFOV is a half of the maximal field of view.

TABLE 12

(5th Embodiment)
f = 1.78 mm, Fno = 1.85, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −20.000 | ASP | 0.436 | Plastic | 1.544 | 55.9 | −4.08 |
| 2 | | 2.515 | ASP | 0.442 | | | | |

TABLE 12-continued (5th Embodiment)
f = 1.78 mm, Fno = 1.85, HFOV = 55.0 deg.

| Surface # | | Curvature Radius | | Thickness | Material | Index | Abbe # | Focal Length |
|---|---|---|---|---|---|---|---|---|
| 3 | Ape. Stop | Plano | | 0.036 | | | | |
| 4 | Lens 2 | 4.857 | ASP | 0.789 | Plastic | 1.544 | 55.9 | 1.65 |
| 5 | | −1.036 | ASP | 0.030 | | | | |
| 6 | Lens 3 | 2.418 | ASP | 0.250 | Plastic | 1.639 | 23.5 | −4.18 |
| 7 | | 1.218 | ASP | 0.251 | | | | |
| 8 | Lens 4 | −5.652 | ASP | 1.078 | Plastic | 1.544 | 55.9 | 1.29 |
| 9 | | −0.664 | ASP | 0.035 | | | | |
| 10 | Lens 5 | 1.529 | ASP | 0.352 | Plastic | 1.639 | 23.5 | −1.57 |
| 11 | | 0.551 | ASP | 0.400 | | | | |
| 12 | IR Cut Filter | Plano | | 0.210 | Glass | 1.517 | 64.2 | — |
| 13 | | Plano | | 0.490 | | | | |
| 14 | Image Surface | Plano | | — | | | | |

Note:
Reference wavelength is d-line 587.6 nm
The effective radius in Surface 5 is 0.720 mm
The effective radius in Surface 1 is 1.085 mm

TABLE 13

Aspheric Coefficients

| Surface # | 1 | 2 | 4 | 5 | 6 |
|---|---|---|---|---|---|
| k = | −1.1102E+00 | −9.0000E+01 | 1.1779E+00 | −3.0234E+00 | −8.9569E+01 |
| A4 = | 2.7778E−01 | 1.0927E+00 | 4.4507E−02 | −7.2308E−01 | −4.0134E−01 |
| A6 = | −2.0368E−01 | −1.6538E+00 | −7.6577E−01 | 2.4402E+00 | 3.0335E−01 |
| A8 = | 1.4088E−01 | 2.8228E+00 | 2.7770E+00 | −7.2056E+00 | −3.3244E−01 |
| A10 = | −4.8469E−02 | −6.1958E−01 | −6.1336E+00 | 1.0429E+01 | −3.8858E−01 |
| A12 = | 3.3165E−03 | | | −6.7177E+00 | 5.7432E−01 |

| Surface # | 7 | 8 | 9 | 10 | 11 |
|---|---|---|---|---|---|
| k = | −5.4666E+00 | −9.9441E+01 | −1.3945E+00 | −2.8863E+01 | −4.7617E+00 |
| A4 = | −3.0846E−01 | 1.9735E−01 | 5.7357E−01 | −3.7193E−02 | −1.7404E−01 |
| A6 = | 4.6713E−01 | −2.8233E−01 | −1.4069E+00 | −3.8480E−01 | 9.1040E−02 |
| A8 = | −5.3439E−01 | 4.6708E−01 | 2.1245E+00 | 5.4272E−01 | −4.0525E−02 |
| A10 = | 2.8150E−01 | −4.8794E−01 | −2.0719E+00 | −4.4508E−01 | 9.0448E−03 |
| A12 = | −4.8994E−02 | 2.6776E−01 | 1.2281E+00 | 1.8376E−01 | −1.7042E−04 |
| A14 = | | −5.8682E−02 | −3.7017E−01 | −3.1319E−02 | −2.8559E−04 |
| A16 = | | | 4.0851E−02 | 1.3027E−03 | 3.5075E−05 |

In the 5th embodiment, the equation of the aspheric surface profiles of the aforementioned lens elements is the same as the equation of the 1st embodiment. Also, the definitions of these parameters shown in TABLE 14 below are the same as those stated in the 1st embodiment with corresponding values for the 5th embodiment, so an explanation in this regard will not be provided again.

Moreover, these parameters can be calculated from TABLE 12 and TABLE 13 and satisfy the conditions stated in TABLE 14.

TABLE 14

5th Embodiment

| f [mm] | 1.78 | (R5 + R6)/(R5 − R6) | 3.03 |
|---|---|---|---|
| Fno | 1.85 | |Sag41|/CT4 | 0.08 |
| HFOV [deg.] | 55.0 | Y11/Y52 | 0.61 |
| V5 | 23.5 | Y52/f | 1.00 |
| T12/(T23 + T34 + T45) | 1.51 | f1/|f3| | −0.98 |
| |R1/R2| | 7.95 | f1/f | −2.29 |
| (R3 + R4)/(R3 − R4) | 0.65 | | |

6th Embodiment

Figure 6A:
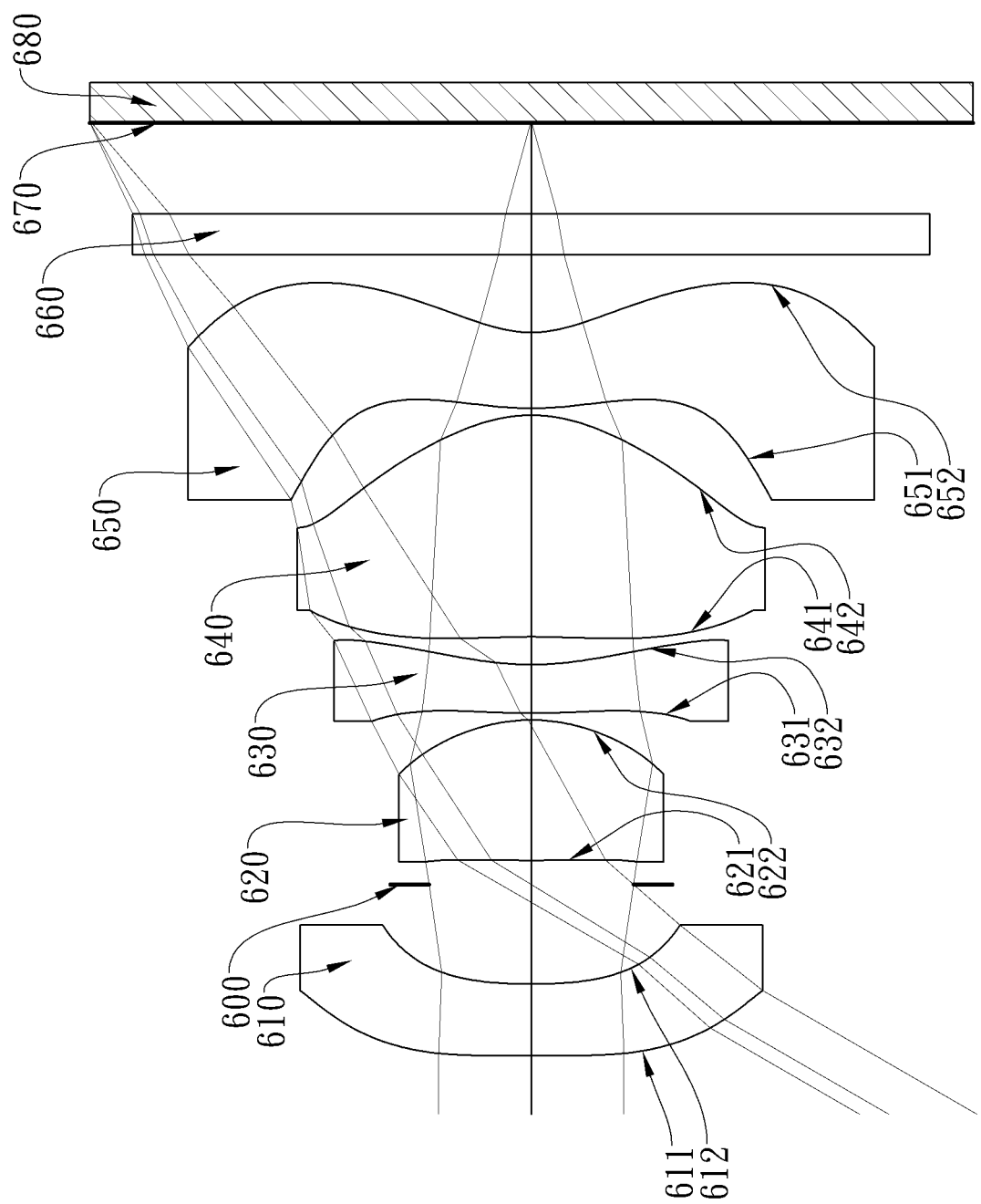
FIG. 6A is a schematic view of an image capturing apparatus according to the 6th embodiment of the present disclosure.
Figure 6B:
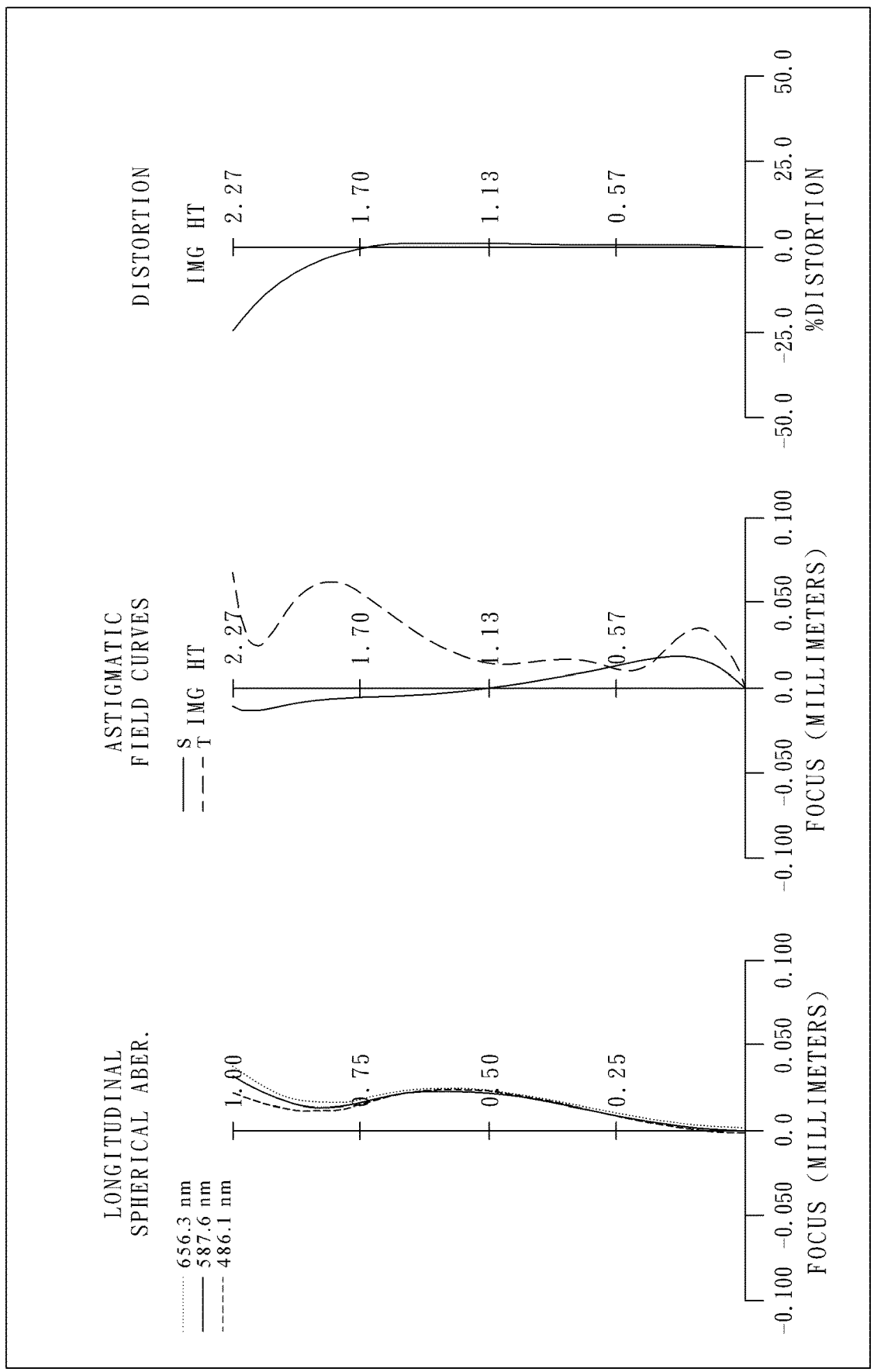
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus includes an imaging lens assembly (not otherwise herein labeled) of the present disclosure and an image sensor 680. The imaging lens assembly includes, in order from an object side to an image side, a first lens element 610, an aperture stop 600, a second lens element 620, a third lens element 630, a fourth lens element 640, and a fifth lens element 650.

The first lens element 610 with negative refractive power has an object-side surface 611 being convex in a paraxial region thereof and an image-side surface 612 being concave in a paraxial region thereof, which are both aspheric, and the first lens element 610 is made of plastic material.

The second lens element 620 with positive refractive power has an object-side surface 621 being convex in a paraxial region thereof and an image-side surface 622 being convex in a paraxial region thereof, which are both aspheric, and the second lens element 620 is made of plastic material.

The third lens element 630 with negative refractive power has an object-side surface 631 being convex in a paraxial region thereof and an image-side surface 632 being concave in a paraxial region thereof, which are both aspheric, and each of the two surfaces has at least one inflection point. The third lens element 630 is made of plastic material.

The fourth lens element 640 with positive refractive power has an object-side surface 641 being concave in a paraxial region thereof and an image-side surface 642 being convex in a paraxial region thereof, which are both aspheric, and the fourth lens element 640 is made of plastic material.

The fifth lens element 650 with negative refractive power has an object-side surface 651 being convex in a paraxial region thereof and an image-side surface 652 being concave in a paraxial region thereof, which are both aspheric, and the fifth lens element 650 is made of plastic material.

The imaging lens assembly further includes an IR cut filter 660 located between the fifth lens element 650 and an image surface 670. The IR cut filter 660 is made of glass material and will not affect the focal length of the imaging lens assembly. The image sensor 680 is disposed on or near the image surface 670 of the imaging lens assembly.

The detailed optical data of the 6th embodiment are shown in TABLE 15, and the aspheric surface data are shown in TABLE 16, wherein the units of the curvature radius, the thickness and the focal length are expressed in mm, and HFOV is a half of the maximal field of view.

TABLE 15

(6th Embodiment)
f = 1.76 mm, Fno = 1.85, HFOV = 60.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 200.000 | ASP | 0.370 | Plastic | 1.544 | 55.9 | −5.03 |
| 2 | | 2.700 | ASP | 0.512 | | | | |
| 3 | Ape. Stop | Plano | | 0.124 | | | | |
| 4 | Lens 2 | 12.347 | ASP | 0.723 | Plastic | 1.544 | 55.9 | 1.59 |
| 5 | | −0.913 | ASP | 0.035 | | | | |
| 6 | Lens 3 | 3.664 | ASP | 0.250 | Plastic | 1.639 | 23.5 | −4.20 |
| 7 | | 1.508 | ASP | 0.143 | | | | |
| 8 | Lens 4 | −4.406 | ASP | 1.141 | Plastic | 1.544 | 55.9 | 1.51 |
| 9 | | −0.755 | ASP | 0.035 | | | | |
| 10 | Lens 5 | 1.525 | ASP | 0.391 | Plastic | 1.639 | 23.5 | −1.81 |
| 11 | | 0.591 | ASP | 0.400 | | | | |
| 12 | IR Cut Filter | Plano | | 0.210 | Glass | 1.517 | 64.2 | — |
| 13 | | Plano | | 0.467 | | | | |
| 14 | Image Surface | Plano | | — | | | | |

Note:
Reference wavelength is d-line 587.6 nm
The effective radius in Surface 5 is 0.680 mm

TABLE 16

Aspheric Coefficients

| Surface # | 1 | 2 | 4 | 5 | 6 |
|---|---|---|---|---|---|
| k = | −1.1602E+00 | −6.8903E+01 | 1.2096E+00 | −1.9790E+00 | −8.9569E+01 |
| A4 = | 2.7818E−01 | 8.1900E−01 | −9.2345E−02 | −1.6252E−01 | −2.7279E−01 |
| A6 = | −1.3373E−01 | −6.9365E−01 | −4.6986E−01 | 3.2067E−01 | 2.8870E−01 |
| A8 = | 3.7592E−02 | 8.6103E−01 | 1.5185E+00 | −2.2286E+00 | −5.9133E−01 |
| A10 = | 2.8151E−02 | | −4.9496E+00 | 4.0174E+00 | 6.2834E−01 |
| A12 = | −1.9344E−02 | | | −3.3785E+00 | −2.8836E−01 |

| Surface # | 7 | 8 | 9 | 10 | 11 |
|---|---|---|---|---|---|
| k = | −5.4688E+00 | −9.9441E+01 | −2.1830E+00 | −2.8875E+01 | −4.7475E+00 |
| A4 = | −2.6391E−01 | 3.3686E−01 | 1.2344E−01 | −1.2931E−01 | −2.2589E−01 |
| A6 = | 3.4731E−01 | −5.5608E−01 | −2.6253E−01 | −3.0407E−01 | 1.7195E−01 |
| A8 = | −3.1936E−01 | 7.4029E−01 | 9.3735E−02 | 4.3730E−01 | −1.1234E−01 |
| A10 = | 1.6659E−01 | −5.9603E−01 | 2.5731E−01 | −3.6485E−01 | 4.8859E−02 |
| A12 = | −4.8472E−02 | 2.6284E−01 | −4.2747E−01 | 7.4760E−02 | −1.3651E−02 |
| A14 = | | −4.8257E−02 | 2.8044E−01 | 4.5090E−02 | 2.1366E−03 |
| A16 = | | | −6.4942E−02 | −1.4868E−02 | −1.3651E−04 |

In the 6th embodiment, the equation of the aspheric surface profiles of the aforementioned lens elements is the same as the equation of the 1st embodiment. Also, the definitions of these parameters shown in TABLE 17 below are the same as those stated in the 1st embodiment with corresponding values for the 6th embodiment, so an explanation in this regard will not be provided again.

Moreover, these parameters can be calculated from TABLE 15 and TABLE 16 and satisfy the conditions stated in TABLE 17.

TABLE 17

6th Embodiment

| | | | |
|---|---|---|---|
| f [mm] | 1.76 | (R5 + R6)/(R5 − R6) | 2.40 |
| Fno | 1.85 | \|Sag41\|/CT4 | 0.12 |
| HFOV [deg.] | 60.0 | Y11/Y52 | 0.67 |
| V5 | 23.5 | Y52/f | 1.00 |
| T12/(T23 + T34 + T45) | 2.99 | f1/\|f3\| | −1.20 |
| \|R1/R2\| | 74.08 | f1/f | −2.86 |
| (R3 + R4)/(R3 − R4) | 0.86 | | |

7th Embodiment

Figure 7A:
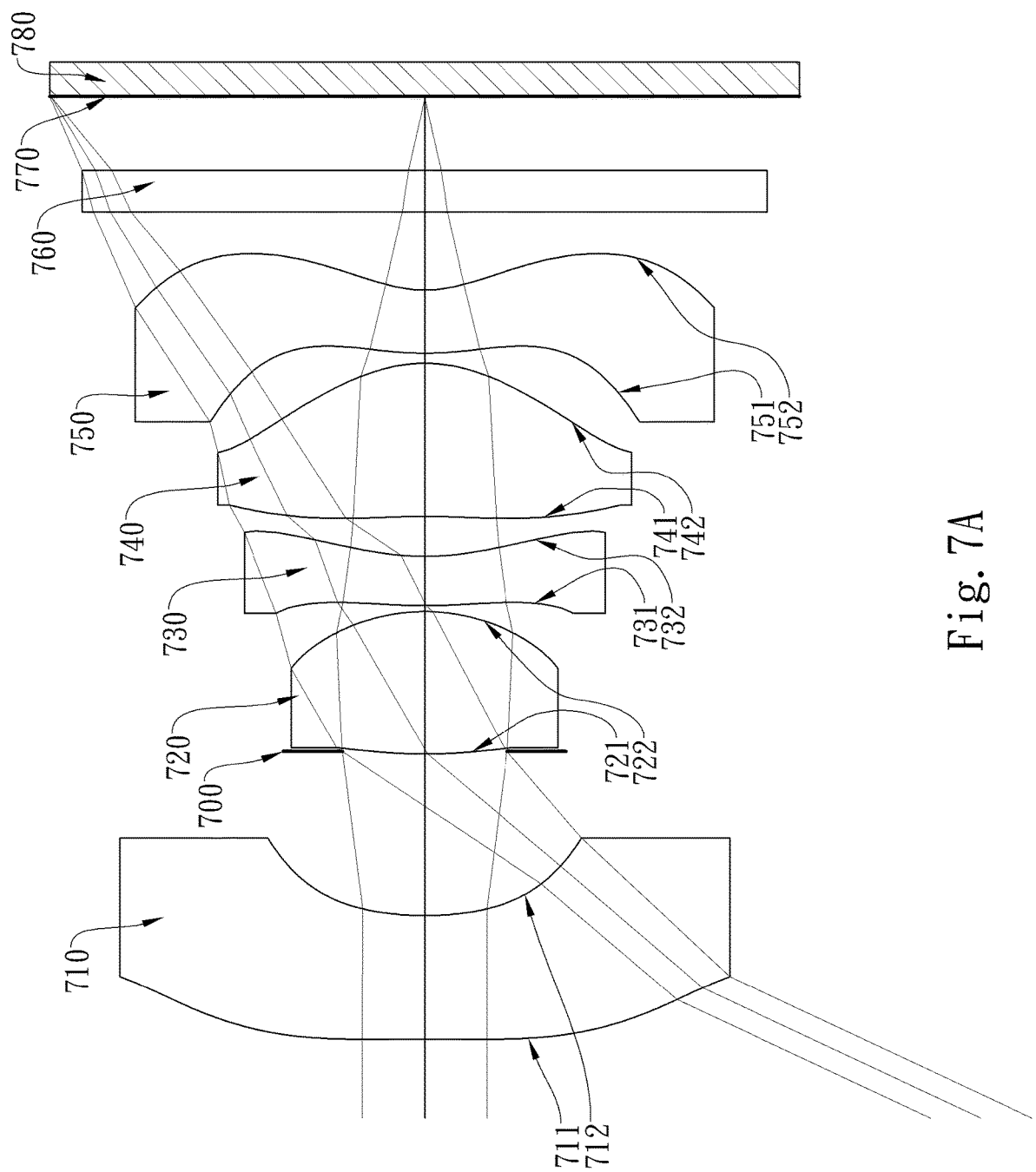
FIG. 7A is a schematic view of an image capturing apparatus according to the 7th embodiment of the present disclosure.
Figure 7B:
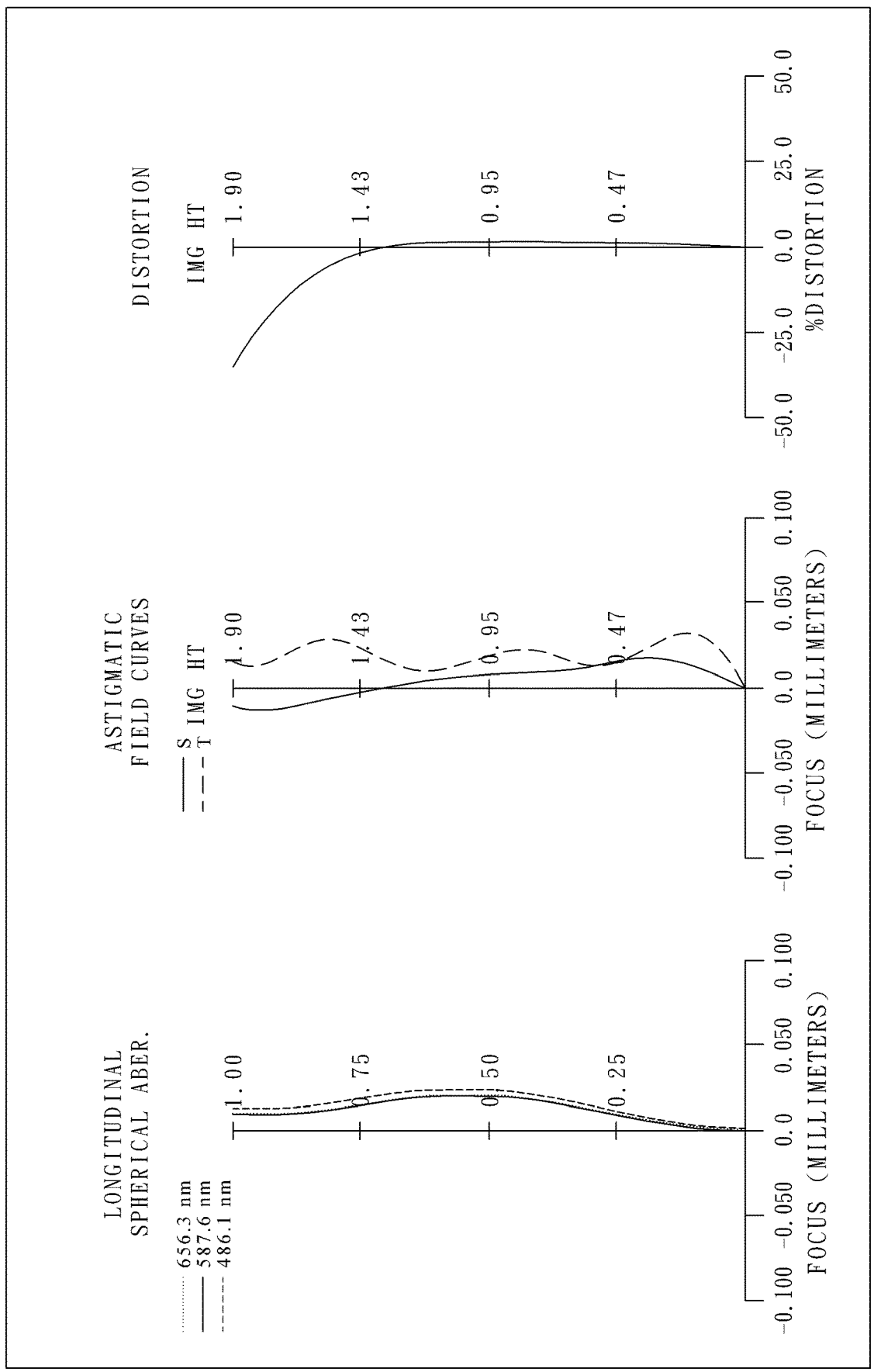
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus includes an imaging lens assembly (not otherwise herein labeled) of the present disclosure and an image sensor 780. The imaging lens assembly includes, in order from an object side to an image side, a first lens element 710, an aperture stop 700, a second lens element 720, a third lens element 730, a fourth lens element 740, and a fifth lens element 750.

The first lens element 710 with negative refractive power has an object-side surface 711 being concave in a paraxial region thereof and an image-side surface 712 being concave in a paraxial region thereof, which are both aspheric, and the first lens element 710 is made of plastic material.

The second lens element 720 with positive refractive power has an object-side surface 721 being convex in a paraxial region thereof and an image-side surface 722 being convex in a paraxial region thereof, which are both aspheric, and the second lens element 720 is made of plastic material.

The third lens element 730 with negative refractive power has an object-side surface 731 being convex in a paraxial region thereof and an image-side surface 732 being concave in a paraxial region thereof, which are both aspheric, and each of the two surfaces has at least one inflection point. The third lens element 730 is made of plastic material.

The fourth lens element 740 with positive refractive power has an object-side surface 741 being concave in a paraxial region thereof and an image-side surface 742 being convex in a paraxial region thereof, which are both aspheric, and the fourth lens element 740 is made of plastic material.

The fifth lens element 750 with negative refractive power has an object-side surface 751 being convex in a paraxial region thereof and an image-side surface 752 being concave in a paraxial region thereof, which are both aspheric, and the fifth lens element 750 is made of plastic material.

The imaging lens assembly further includes an IR cut filter 760 located between the fifth lens element 750 and an image surface 770. The IR cut filter 760 is made of glass material and will not affect the focal length of the imaging lens assembly. The image sensor 780 is disposed on or near the image surface 770 of the imaging lens assembly.

The detailed optical data of the 7th embodiment are shown in TABLE 18, and the aspheric surface data are shown in TABLE 19, wherein the units of the curvature radius, the thickness and the focal length are expressed in mm, and HFOV is a half of the maximal field of view.

TABLE 18

(7th Embodiment)
f = 1.41 mm, Fno = 2.22, HFOV = 64.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −26.531 | ASP | 0.632 | Plastic | 1.544 | 56.0 | −2.84 |
| 2 | | 1.655 | ASP | 0.833 | | | | |
| 3 | Ape. Stop | Plano | | −0.012 | | | | |
| 4 | Lens 2 | 2.605 | ASP | 0.726 | Plastic | 1.544 | 56.0 | 1.38 |
| 5 | | −0.952 | ASP | 0.030 | | | | |
| 6 | Lens 3 | 3.048 | ASP | 0.250 | Plastic | 1.660 | 20.4 | −3.83 |
| 7 | | 1.336 | ASP | 0.202 | | | | |
| 8 | Lens 4 | −4.543 | ASP | 0.782 | Plastic | 1.544 | 56.0 | 1.47 |
| 9 | | −0.720 | ASP | 0.050 | | | | |
| 10 | Lens 5 | 1.394 | ASP | 0.321 | Plastic | 1.660 | 20.4 | −1.88 |
| 11 | | 0.597 | ASP | 0.400 | | | | |
| 12 | IR Cut Filter | Plano | | 0.210 | Glass | 1.517 | 64.2 | — |
| 13 | | Plano | | 0.377 | | | | |
| 14 | Image Surface | Plano | | — | | | | |

Note:
Reference wavelength is d-line 587.6 nm

TABLE 19

Aspheric Coefficients

| Surface # | 1 | 2 | 4 | 5 | 6 |
|---|---|---|---|---|---|
| k = | −2.9334E+01 | −2.0928E+01 | −1.4943E+01 | −1.4106E+00 | −6.9075E+01 |
| A4 = | 1.6862E−01 | 8.5813E−01 | −1.8270E−02 | −8.0542E−02 | −2.1268E−01 |

TABLE 19-continued

| Aspheric Coefficients | | | | | |
|---|---|---|---|---|---|
| A6 = | −9.2694E−02 | −8.5542E−01 | −6.6590E−02 | −1.8551E−01 | −3.5599E−01 |
| A8 = | 4.6219E−02 | 1.5089E+00 | −1.5050E+00 | −3.4367E−01 | 1.0585E+00 |
| A10 = | −1.5581E−02 | −8.9367E−01 | −1.8774E−01 | 1.2483E+00 | −1.1004E+00 |
| A12 = | 1.9945E−03 | | | −3.7057E+00 | −2.3713E−01 |

| Surface # | 7 | 8 | 9 | 10 | 11 |
|---|---|---|---|---|---|
| k = | −2.0151E+00 | −1.0225E+00 | −5.1016E+00 | −2.1405E+01 | −5.0144E+00 |
| A4 = | −3.7171E−01 | 4.5321E−01 | −7.0239E−01 | −4.0853E−01 | −3.7893E−01 |
| A6 = | 3.4050E−01 | −7.6090E−01 | 2.3521E+00 | 9.6529E−02 | 3.7443E−01 |
| A8 = | −1.8976E−01 | 1.1085E+00 | −5.5557E+00 | −3.2129E−01 | −3.1850E−01 |
| A10 = | 1.9843E−02 | −1.1016E+00 | 8.3874E+00 | 5.8425E−01 | 1.9014E−01 |
| A12 = | −4.2467E−02 | 6.1182E−01 | −7.3425E+00 | −5.3247E−01 | −7.7028E−02 |
| A14 = | | −1.4104E−01 | 3.4194E+00 | 2.3628E−01 | 1.7913E−02 |
| A16 = | | | −6.4937E−01 | −3.7447E−02 | −1.7050E−03 |

In the 7th embodiment, the equation of the aspheric surface profiles of the aforementioned lens elements is the same as the equation of the 1st embodiment. Also, the definitions of these parameters shown in TABLE 20 below are the same as those stated in the 1st embodiment with corresponding values for the 7th embodiment, so an explanation in this regard will not be provided again.

Moreover, these parameters can be calculated from TABLE 18 and TABLE 19 and satisfy the conditions stated in TABLE 20.

TABLE 20

| 7th Embodiment | | | |
|---|---|---|---|
| f [mm] | 1.41 | (R5 + R6)/(R5 − R6) | 2.56 |
| Fno | 2.22 | |Sag41|/CT4 | 0.07 |
| HFOV [deg.] | 64.9 | Y11/Y52 | 1.05 |
| V5 | 20.4 | Y52/f | 1.04 |
| T12/(T23 + T34 + T45) | 2.91 | f1/f3| | −0.74 |
| |R1/R2| | 16.03 | f1/f | −2.01 |
| (R3 + R4)/(R3 − R4) | 0.46 | | |

8th Embodiment

Figure 8A:
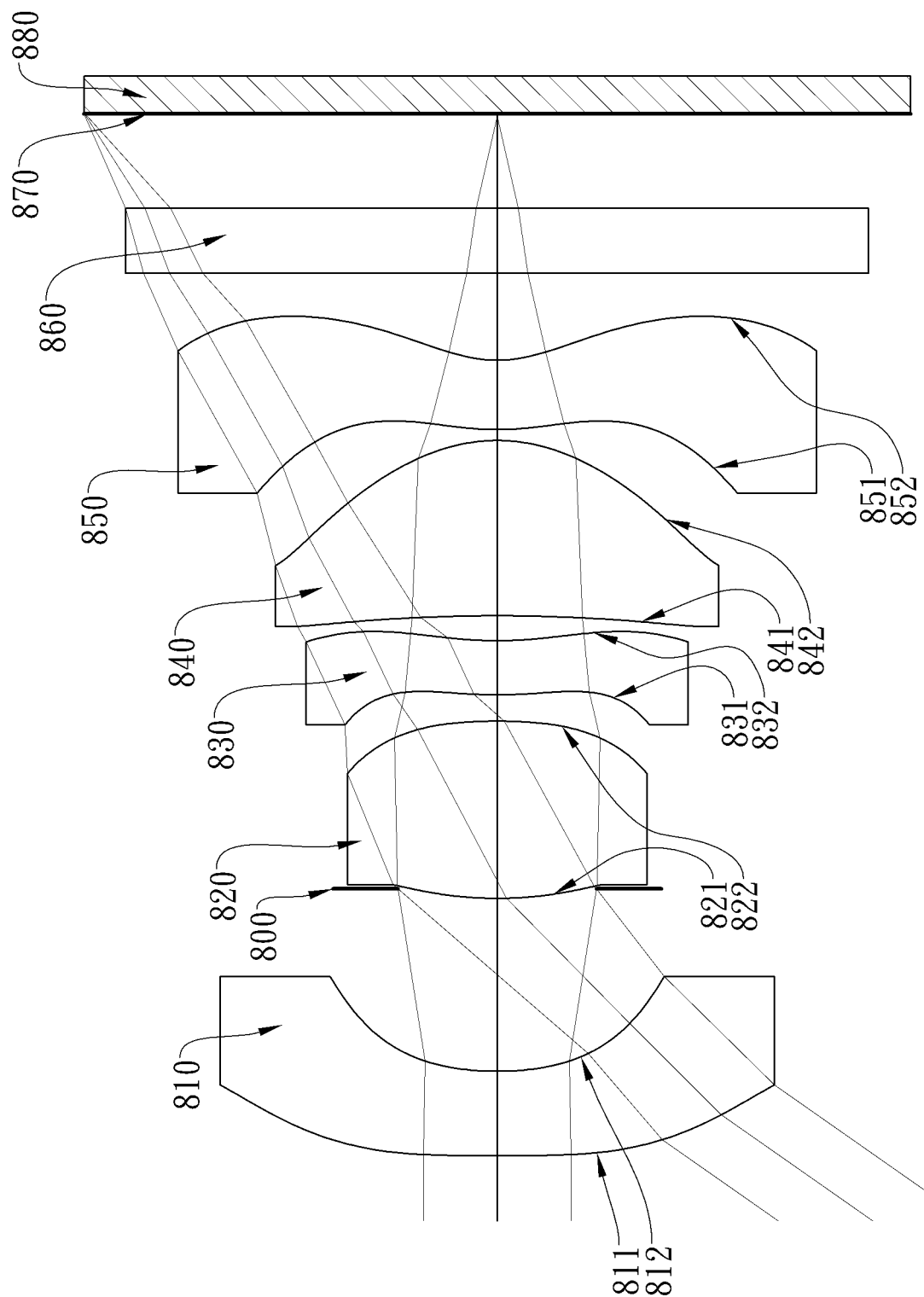
FIG. 8A is a schematic view of an image capturing apparatus according to the 8th embodiment of the present disclosure.
Figure 8B:
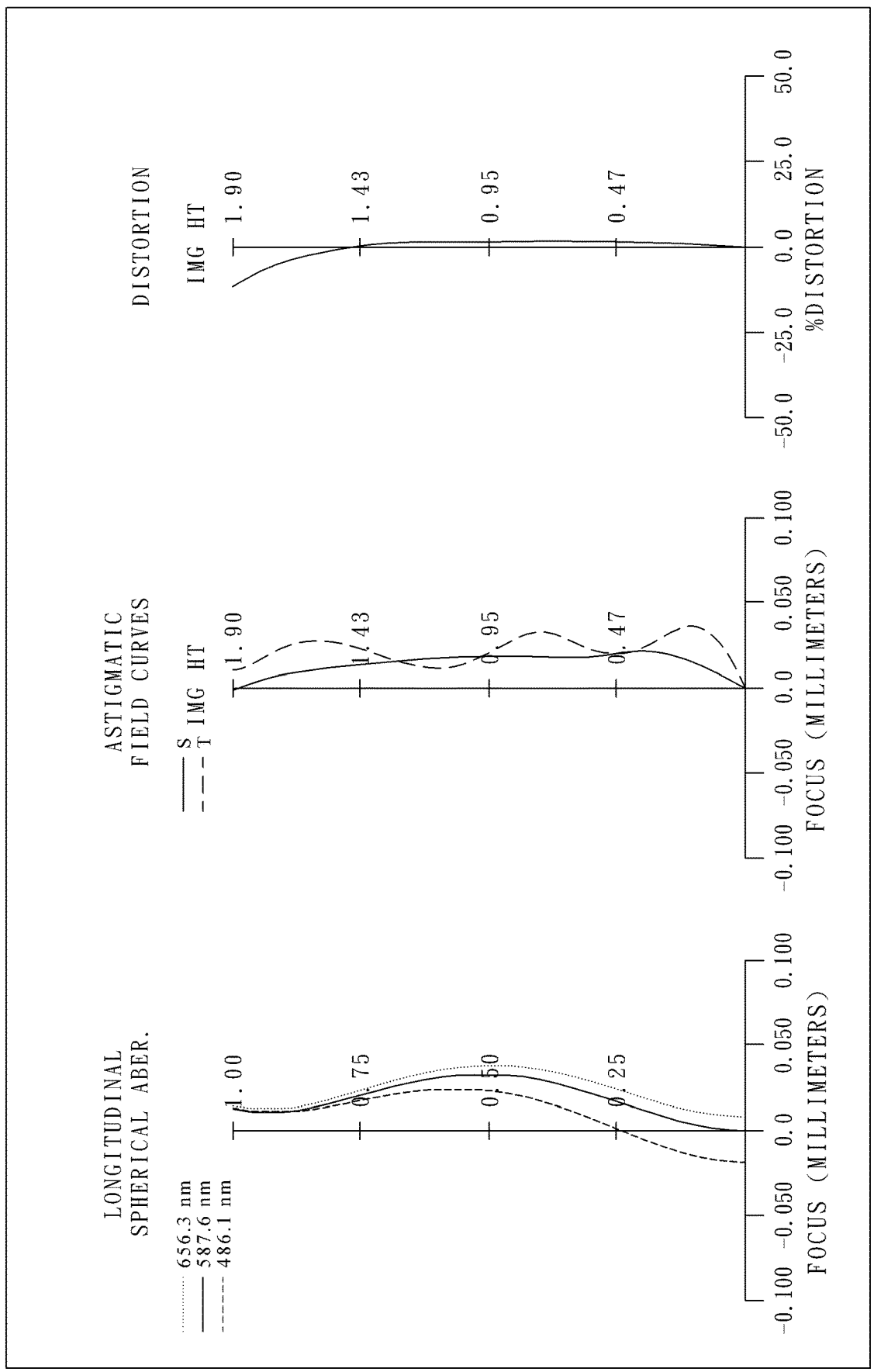
FIG. 8B shows longitudinal spherical aberration curves, astigmatic field curves and a distortion curve of the image capturing apparatus according to the 8th embodiment.

FIG. 8A is a schematic view of an image capturing apparatus according to the 8th embodiment of the present disclosure. FIG. 8B shows, in order from left to right, longitudinal spherical aberration curves, astigmatic field curves and a distortion curve of the image capturing apparatus according to the 8th embodiment.

In FIG. 8A, the image capturing apparatus includes an imaging lens assembly (not otherwise herein labeled) of the present disclosure and an image sensor 880. The imaging lens assembly includes, in order from an object side to an image side, a first lens element 810, an aperture stop 800, a second lens element 820, a third lens element 830, a fourth lens element 840, and a fifth lens element 850.

The first lens element 810 with negative refractive power has an object-side surface 811 being convex in a paraxial region thereof and an image-side surface 812 being concave in a paraxial region thereof, which are both aspheric, and the first lens element 810 is made of plastic material.

The second lens element 820 with positive refractive power has an object-side surface 821 being convex in a paraxial region thereof and an image-side surface 822 being convex in a paraxial region thereof, which are both aspheric, and the second lens element 820 is made of plastic material.

The third lens element 830 with positive refractive power has an object-side surface 831 being convex in a paraxial region thereof and an image-side surface 832 being concave in a paraxial region thereof, which are both aspheric, and each of the two surfaces has at least one inflection point. The third lens element 830 is made of plastic material.

The fourth lens element 840 with positive refractive power has an object-side surface 841 being concave in a paraxial region thereof and an image-side surface 842 being convex in a paraxial region thereof, which are both aspheric, and the fourth lens element 840 is made of plastic material.

The fifth lens element 850 with negative refractive power has an object-side surface 851 being convex in a paraxial region thereof and an image-side surface 852 being concave in a paraxial region thereof, which are both aspheric, and the fifth lens element 850 is made of plastic material.

The imaging lens assembly further includes an IR cut filter 860 located between the fifth lens element 850 and an image surface 870. The IR cut filter 860 is made of glass material and will not affect the focal length of the imaging lens assembly. The image sensor 880 is disposed on or near the image surface 870 of the imaging lens assembly.

The detailed optical data of the 8th embodiment are shown in TABLE 21, and the aspheric surface data are shown in TABLE 22, wherein the units of the curvature radius, the thickness and the focal length are expressed in mm, and HFOV is a half of the maximal field of view.

TABLE 21

(8th Embodiment)
f = 1.51 mm, Fno = 2.22, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 37.435 | ASP | 0.389 | Plastic | 1.544 | 56.0 | −2.54 |
| 2 | | 1.330 | ASP | 0.841 | | | | |
| 3 | Ape. Stop | Plano | | −0.044 | | | | |

TABLE 21-continued (8th Embodiment)
f = 1.51 mm, Fno = 2.22, HFOV = 55.0 deg.

| Surface # | | Curvature Radius | | Thickness | Material | Index | Abbe # | Focal Length |
|---|---|---|---|---|---|---|---|---|
| 4 | Lens 2 | 1.696 | ASP | 0.817 | Plastic | 1.544 | 56.0 | 2.05 |
| 5 | | −2.702 | ASP | 0.121 | | | | |
| 6 | Lens 3 | 1.784 | ASP | 0.250 | Plastic | 1.660 | 20.4 | 150.70 |
| 7 | | 1.715 | ASP | 0.115 | | | | |
| 8 | Lens 4 | −7.003 | ASP | 0.808 | Plastic | 1.544 | 56.0 | 1.58 |
| 9 | | −0.795 | ASP | 0.050 | | | | |
| 10 | Lens 5 | 1.179 | ASP | 0.320 | Plastic | 1.660 | 20.4 | −2.14 |
| 11 | | 0.573 | ASP | 0.400 | | | | |
| 12 | IR Cut Filter | Plano | | 0.300 | Glass | 1.517 | 64.2 | — |
| 13 | | Plano | | 0.436 | | | | |
| 14 | Image Surface | Plano | | — | | | | |

Note:
Reference wavelength is d-line 587.6 nm

TABLE 22

Aspheric Coefficients

| Surface # | 1 | 2 | 4 | 5 | 6 |
|---|---|---|---|---|---|
| k = | −2.9334E+01 | −2.0923E+01 | −3.1355E+00 | −1.0001E+00 | −3.5468E+01 |
| A4 = | 2.9571E−01 | 1.3720E+00 | 4.3044E−02 | −9.4174E−01 | −6.3886E−01 |
| A6 = | −2.4440E−01 | −2.1536E+00 | −3.2606E−01 | 1.5848E+00 | −8.0699E−01 |
| A8 = | 1.7144E−01 | 3.9535E+00 | 9.8234E−01 | −3.3334E+00 | 1.2597E+00 |
| A10 = | −7.7202E−02 | −2.7651E+00 | −4.4170E+00 | 4.1912E+00 | −1.2813E+00 |
| A12 = | 1.3637E−02 | | | −3.7057E+00 | −2.3713E−01 |

| Surface # | 7 | 8 | 9 | 10 | 11 |
|---|---|---|---|---|---|
| k = | −3.2078E+00 | −1.0000E+00 | −4.3868E+00 | −1.6420E+01 | −4.2946E+00 |
| A4 = | −5.3268E−01 | 9.4445E−02 | −8.5004E−01 | −5.9618E−01 | −4.6913E−01 |
| A6 = | 3.0716E−01 | −3.9404E−01 | 2.4810E+00 | 4.0417E−01 | 5.2692E−01 |
| A8 = | −1.1662E−01 | 8.4018E−01 | −5.8075E+00 | −4.3957E−01 | −4.1955E−01 |
| A10 = | 7.9288E−02 | −9.8780E−01 | 8.5429E+00 | 5.9587E−01 | 2.1970E−01 |
| A12 = | −4.2467E−02 | 6.1182E−01 | −7.3425E+00 | −5.3247E−01 | −7.2826E−02 |
| A14 = | | −1.4104E−01 | 3.4194E+00 | 2.3628E−01 | 1.3558E−02 |
| A16 = | | | −6.4937E−01 | −3.7447E−02 | −1.0701E−03 |

In the 8th embodiment, the equation of the aspheric surface profiles of the aforementioned lens elements is the same as the equation of the 1st embodiment. Also, the definitions of these parameters shown in TABLE 23 below are the same as those stated in the 1st embodiment with corresponding values for the 8th embodiment, so an explanation in this regard will not be provided again.

Moreover, these parameters can be calculated from TABLE 21 and TABLE 22 and satisfy the conditions stated in TABLE 23.

TABLE 23

| 8th Embodiment | | | |
|---|---|---|---|
| f [mm] | 1.51 | (R5 + R6)/(R5 − R6) | 51.00 |
| Fno | 2.22 | \|Sag41\|/CT4 | 0.06 |
| HFOV [deg.] | 55.0 | Y11/Y52 | 0.87 |
| V5 | 20.4 | Y52/f | 0.97 |
| T12/(T23 + T34 + T45) | 2.79 | f1/\|f3\| | −0.02 |
| \|R1/R2\| | 28.15 | f1/f | −1.68 |
| (R3 + R4)/(R3 − R4) | −0.23 | | |

9th Embodiment

Figure 9A:
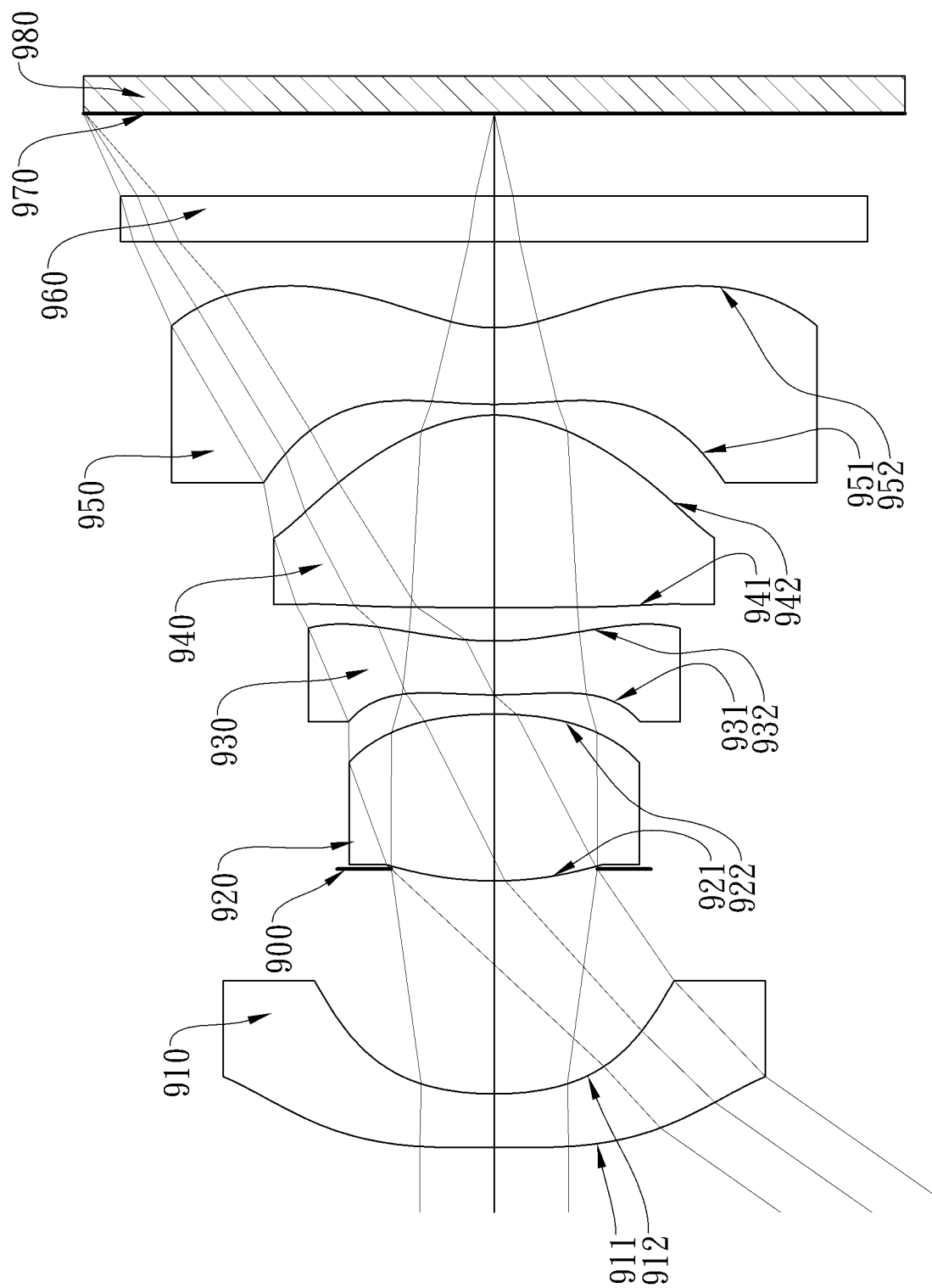
FIG. 9A is a schematic view of an image capturing apparatus according to the 9th embodiment of the present disclosure.
Figure 9B:
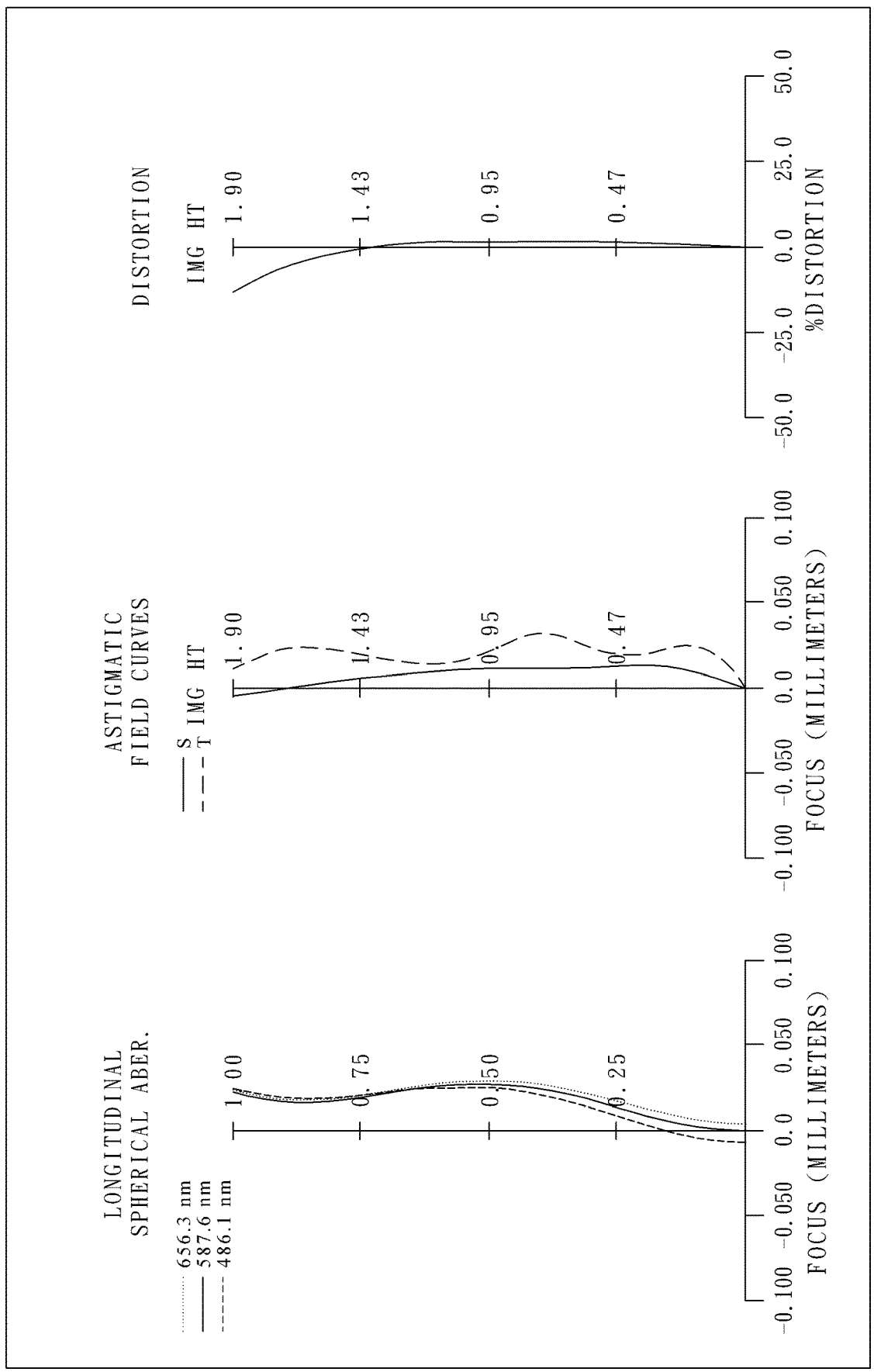
FIG. 9B shows longitudinal spherical aberration curves, astigmatic field curves and a distortion curve of the image capturing apparatus according to the 9th embodiment.

FIG. 9A is a schematic view of an image capturing apparatus according to the 8th embodiment of the present disclosure. FIG. 9B shows, in order from left to right, longitudinal spherical aberration curves, astigmatic field curves and a distortion curve of the image capturing apparatus according to the 9th embodiment.

In FIG. 9A, the image capturing apparatus includes an imaging lens assembly (not otherwise herein labeled) of the present disclosure and an image sensor 980. The imaging lens assembly includes, in order from an object side to an image side, a first lens element 910, an aperture stop 900, a second lens element 920, a third lens element 930, a fourth lens element 940, and a fifth lens element 950.

The first lens element 910 with negative refractive power has an object-side surface 911 being planar in a paraxial region thereof and an image-side surface 912 being concave in a paraxial region thereof, which are both aspheric, and the first lens element 910 is made of plastic material.

The second lens element 920 with positive refractive power has an object-side surface 921 being convex in a paraxial region thereof and an image-side surface 922 being convex in a paraxial region thereof, which are both aspheric, and the second lens element 920 is made of plastic material.

The third lens element 930 with negative refractive power has an object-side surface 931 being convex in a paraxial region thereof and an image-side surface 932 being concave in a paraxial region thereof, which are both aspheric, and each of the two surfaces has at least one inflection point. The third lens element 930 is made of plastic material.

The fourth lens element 940 with positive refractive power has an object-side surface 941 being concave in a paraxial region thereof and an image-side surface 942 being convex in a paraxial region thereof, which are both aspheric, and the fourth lens element 940 is made of plastic material.

The fifth lens element 950 with negative refractive power has an object-side surface 951 being convex in a paraxial region thereof and an image-side surface 952 being concave in a paraxial region thereof, which are both aspheric, and the fifth lens element 950 is made of plastic material.

The imaging lens assembly further includes an IR cut filter 960 located between the fifth lens element 950 and an image surface 970. The IR cut filter 960 is made of glass material and will not affect the focal length of the imaging lens assembly. The image sensor 980 is disposed on or near the image surface 970 of the imaging lens assembly.

The detailed optical data of the 9th embodiment are shown in TABLE 24, and the aspheric surface data are shown in TABLE 25, wherein the units of the curvature radius, the thickness and the focal length are expressed in mm, and HFOV is a half of the maximal field of view.

TABLE 24

(9th Embodiment)
f = 1.53 mm, Fno = 2.22, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | ∞ | ASP | 0.250 | Plastic | 1.514 | 56.8 | −2.91 |
| 2 | | 1.495 | ASP | 1.044 | | | | |
| 3 | Ape. Stop | Plano | | −0.056 | | | | |
| 4 | Lens 2 | 1.599 | ASP | 0.775 | Plastic | 1.544 | 56.0 | 1.75 |
| 5 | | −1.940 | ASP | 0.089 | | | | |
| 6 | Lens 3 | 2.399 | ASP | 0.250 | Plastic | 1.639 | 23.5 | −5.97 |
| 7 | | 1.412 | ASP | 0.156 | | | | |
| 8 | Lens 4 | −97.909 | ASP | 0.893 | Plastic | 1.544 | 56.0 | 1.34 |
| 9 | | −0.728 | ASP | 0.050 | | | | |
| 10 | Lens 5 | 2.007 | ASP | 0.356 | Plastic | 1.639 | 23.5 | −1.63 |
| 11 | | 0.638 | ASP | 0.400 | | | | |
| 12 | IR Cut Filter | Plano | | 0.210 | Glass | 1.517 | 64.2 | — |
| 13 | | Plano | | 0.385 | | | | |
| 14 | Image Surface | Plano | | — | | | | |

Note:
Reference wavelength is d-line 587.6 nm

TABLE 25

Aspheric Coefficients

| Surface # | 1 | 2 | 4 | 5 | 6 |
|---|---|---|---|---|---|
| k = | 0.0000E+00 | −2.0928E+01 | −1.5258E+00 | −2.8595E+00 | −7.3248E+01 |
| A4 = | 4.5722E−01 | 1.2719E+00 | 2.4248E−02 | −7.5945E−01 | −6.8723E−01 |
| A6 = | −5.4948E−01 | −1.6184E+00 | −1.0667E−01 | 1.6159E+00 | −2.8856E−01 |
| A8 = | 5.4062E−01 | 2.1659E+00 | 2.2533E−01 | −3.7548E+00 | 1.0256E+00 |
| A10 = | −3.5786E−01 | −5.3613E−01 | −2.5022E+00 | 4.2910E+00 | −2.4748E+00 |
| A12 = | 1.2503E−01 | −8.0766E−01 | | −3.7057E+00 | −2.3713E−01 |
| A14 = | −1.7672E−02 | | | | |

| Surface # | 7 | 8 | 9 | 10 | 11 |
|---|---|---|---|---|---|
| k = | −1.0000E+00 | −1.0000E+00 | −5.7801E+00 | −3.5651E+01 | −4.9937E+00 |
| A4 = | −5.8717E−01 | 1.0295E−01 | −9.6216E−01 | −5.6470E−01 | −3.4674E−01 |
| A6 = | 6.7082E−01 | −2.0267E−01 | 2.7615E+00 | 3.9327E−01 | 3.1663E−01 |
| A8 = | −6.8666E−01 | 5.3224E−01 | −6.0586E+00 | −4.9987E−01 | −2.1226E−01 |
| A10 = | 2.7334E−01 | −8.9201E−01 | 8.6065E+00 | 6.1737E−01 | 9.0225E−02 |
| A12 = | −4.2467E−02 | 6.1182E−01 | −7.3425E+00 | −5.3247E−01 | −2.3733E−02 |
| A14 = | | −1.4104E−01 | 3.4194E+00 | 2.3628E−01 | 3.4469E−03 |
| A16 = | | | −6.4937E−01 | −3.7447E−02 | −2.1443E−04 |

In the 9th embodiment, the equation of the aspheric surface profiles of the aforementioned lens elements is the same as the equation of the 1st embodiment. Also, the definitions of these parameters shown in TABLE 26 below are the same as those stated in the 1st embodiment with corresponding values for the 9th embodiment, so an explanation in this regard will not be provided again.

Moreover, these parameters can be calculated from TABLE 24 and TABLE 25 and satisfy the conditions stated in TABLE 26.

TABLE 26

9th Embodiment

| | | | |
|---|---|---|---|
| f [mm] | 1.53 | (R5 + R6)/(R5 − R6) | 3.86 |
| Fno | 2.22 | \|Sag41\|/CT4 | 0.01 |
| HFOV [deg.] | 55.0 | Y11/Y52 | 0.84 |
| V5 | 23.5 | Y52/f | 0.98 |
| T12/(T23 + T34 + T45) | 3.35 | f1/\|f3\| | −0.49 |
| \|R1/R2\| | ∞ | f1/f | −1.90 |
| (R3 + R4)/(R3 − R4) | −0.10 | | |

10th Embodiment

Figure 10A:
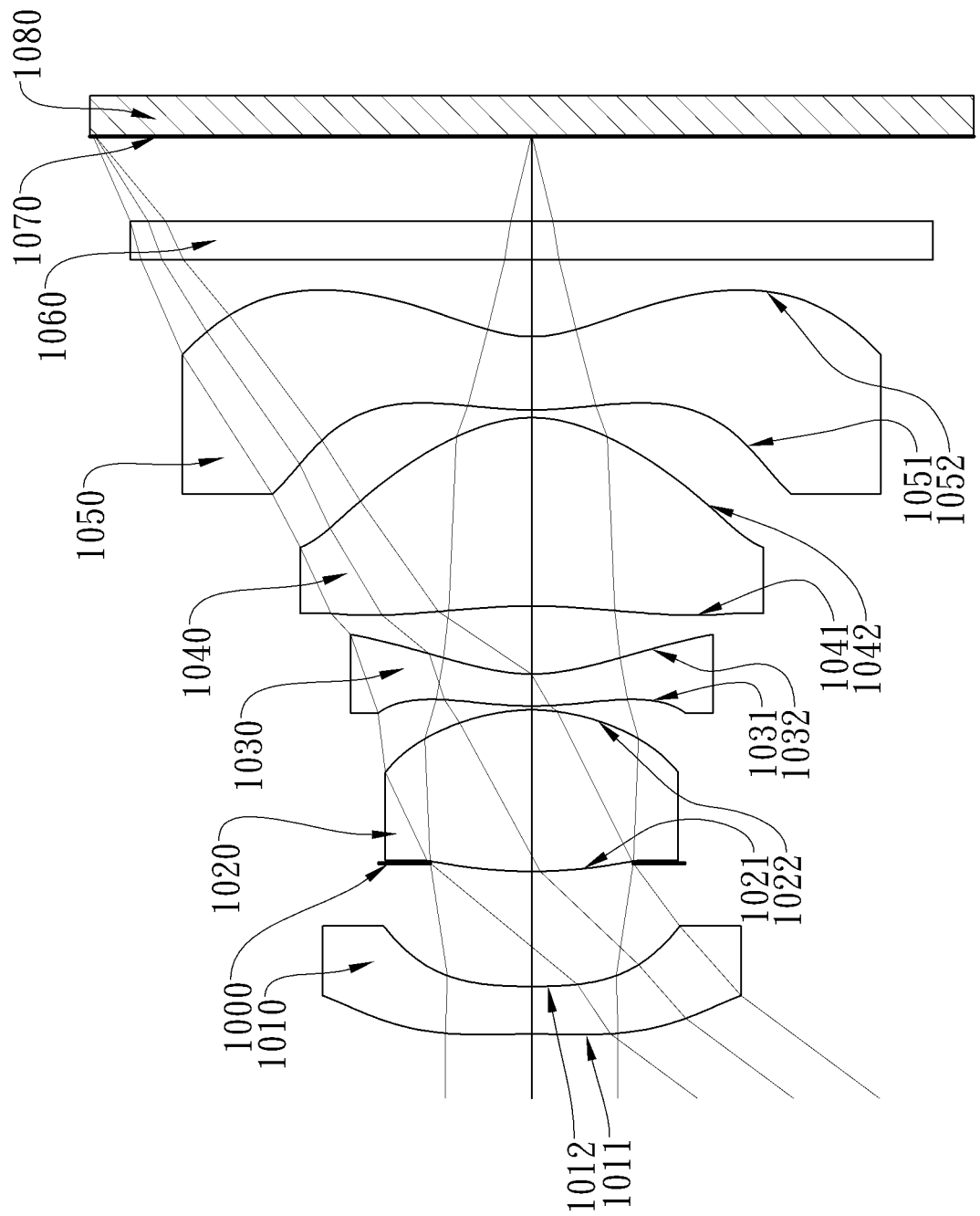
FIG. 10A is a schematic view of an image capturing apparatus according to the 10th embodiment of the present disclosure.
Figure 10B:
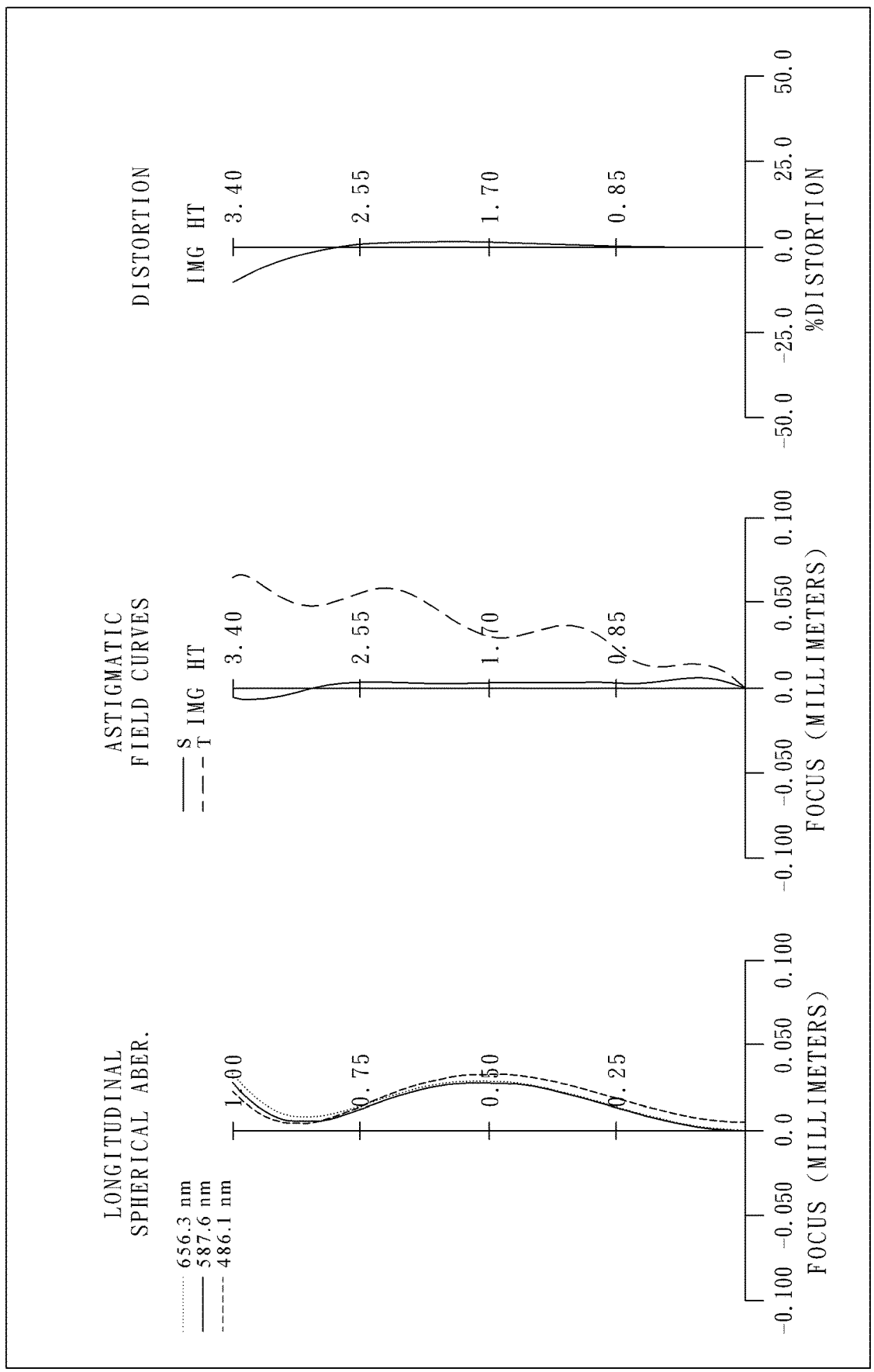
FIG. 10B shows longitudinal spherical aberration curves, astigmatic field curves and a distortion curve of the image capturing apparatus according to the 10th embodiment.
Figure 11A:
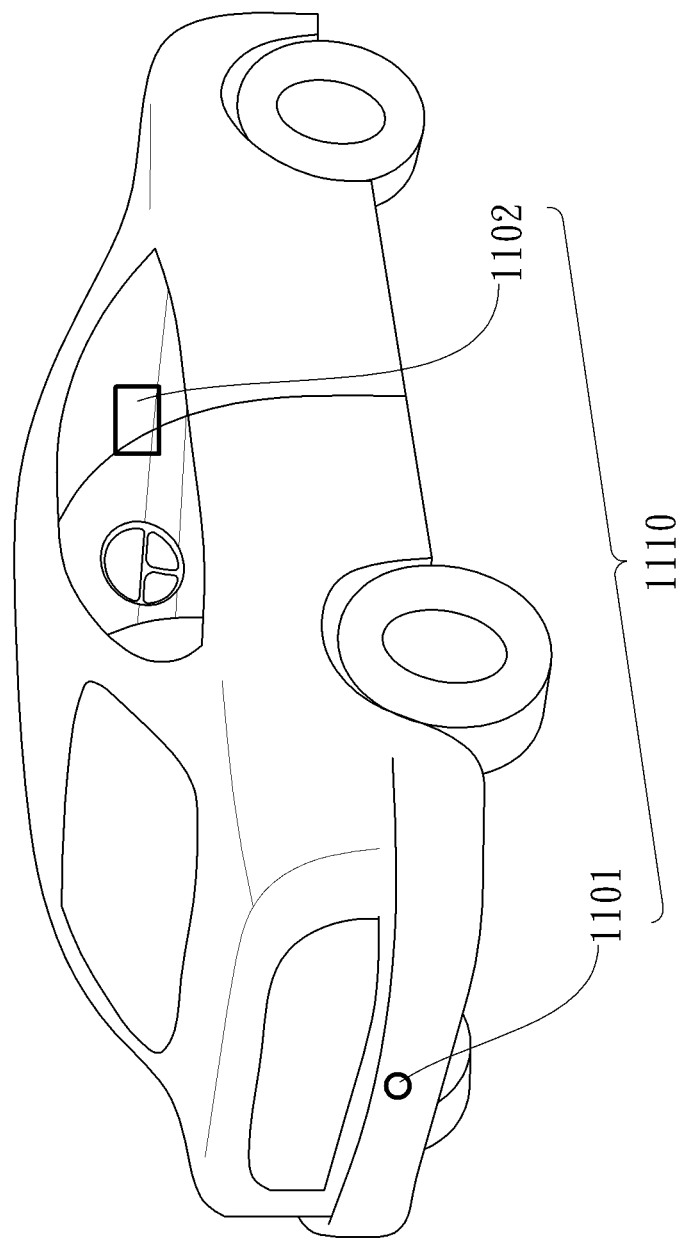
FIG. 11A shows a rear view camera with an image capturing apparatus of the present disclosure installed therein.
Figure 11B:
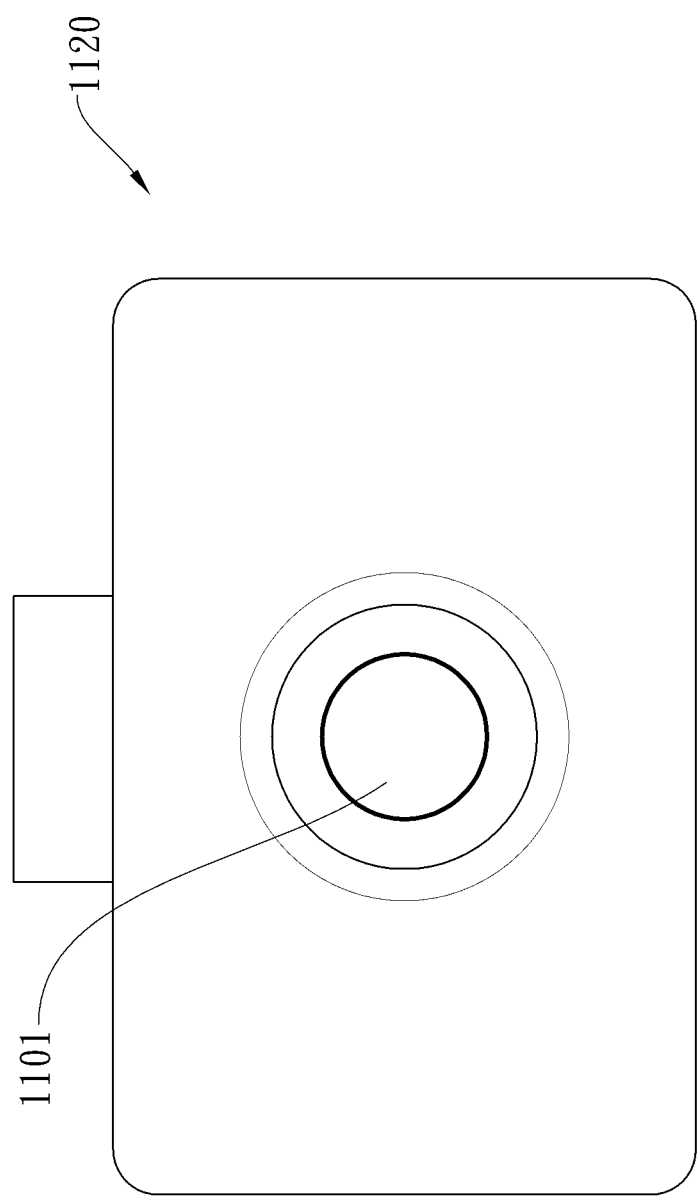
FIG. 11B shows driving recording system with an image capturing apparatus of the present disclosure installed therein.
Figure 11C:
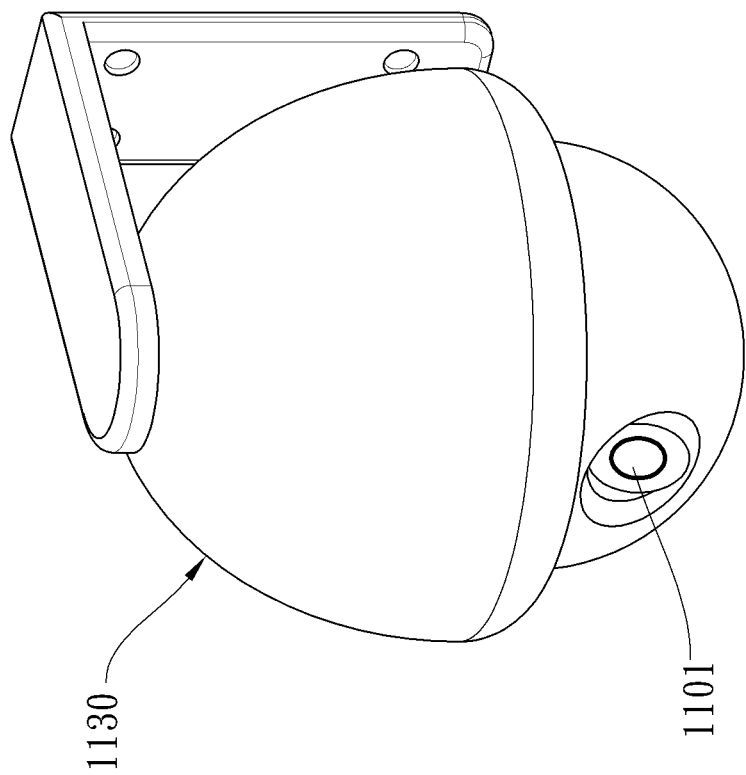
FIG. 11C shows yet another surveillance camera with an image capturing apparatus of the present disclosure installed therein.
Figure 11D:
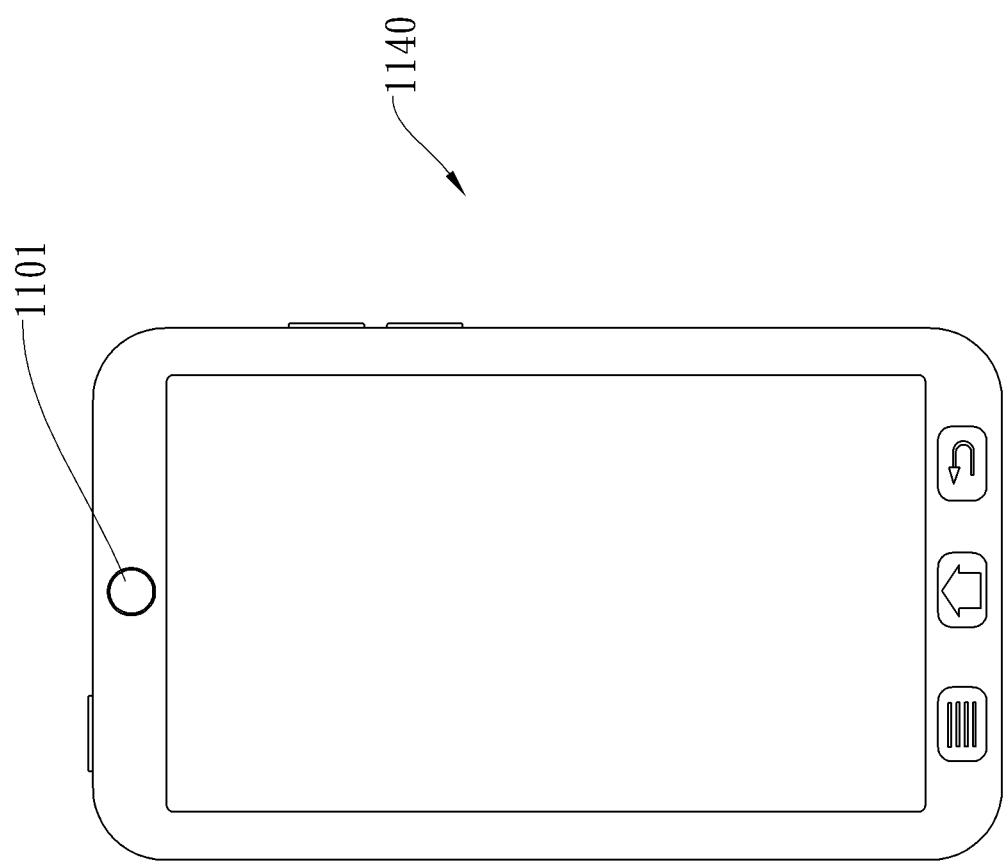
FIG. 11D shows yet another smart phone with an image capturing apparatus of the present disclosure installed therein.

FIG. 10A is a schematic view of an image capturing apparatus according to the 8th embodiment of the present disclosure. FIG. 10B shows, in order from left to right, longitudinal spherical aberration curves, astigmatic field curves and a distortion curve of the image capturing apparatus according to the 10th embodiment.

In FIG. 10A, the image capturing apparatus includes an imaging lens assembly (not otherwise herein labeled) of the present disclosure and an image sensor 1080. The imaging lens assembly includes, in order from an object side to an image side, a first lens element 1010, an aperture stop 1000, a second lens element 1020, a third lens element 1030, a fourth lens element 1040, and a fifth lens element 1050.

The first lens element 1010 with negative refractive power has an object-side surface 1011 being concave in a paraxial region thereof and an image-side surface 1012 being concave in a paraxial region thereof, which are both aspheric, and the first lens element 1010 is made of plastic material.

The second lens element 1020 with positive refractive power has an object-side surface 1021 being convex in a paraxial region thereof and an image-side surface 1022 being convex in a paraxial region thereof, which are both aspheric, and the second lens element 1020 is made of plastic material.

The third lens element 1030 with negative refractive power has an object-side surface 1031 being convex in a paraxial region thereof and an image-side surface 1032 being concave in a paraxial region thereof, which are both aspheric, and each of the two surfaces has at least one inflection point. The third lens element 1030 is made of plastic material.

The fourth lens element 1040 with positive refractive power has an object-side surface 1041 being concave in a paraxial region thereof and an image-side surface 1042 being convex in a paraxial region thereof, which are both aspheric, and the fourth lens element 1040 is made of plastic material.

The fifth lens element 1050 with negative refractive power has an object-side surface 1051 being convex in a paraxial region thereof and an image-side surface 1052 being concave in a paraxial region thereof, which are both aspheric, and the fifth lens element 1050 is made of plastic material.

The imaging lens assembly further includes an IR cut filter 1060 located between the fifth lens element 1050 and an image surface 1070. The IR cut filter 1060 is made of glass material and will not affect the focal length of the imaging lens assembly. The image sensor 1080 is disposed on or near the image surface 1070 of the imaging lens assembly.

The detailed optical data of the 10th embodiment are shown in TABLE 27, and the aspheric surface data are shown in TABLE 28, wherein the units of the curvature radius, the thickness and the focal length are expressed in mm, and HFOV is a half of the maximal field of view.

TABLE 27

(10th Embodiment)
f = 2.82 mm, Fno = 2.10, HFOV = 53.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −11.105 | ASP | 0.371 | Plastic | 1.514 | 56.8 | −6.41 |
| 2 | | 4.732 | ASP | 0.961 | | | | |
| 3 | Ape. Stop | Plano | | −0.064 | | | | |
| 4 | Lens 2 | 3.686 | ASP | 1.259 | Plastic | 1.544 | 56.0 | 2.16 |
| 5 | | −1.520 | ASP | 0.030 | | | | |
| 6 | Lens 3 | 2.635 | ASP | 0.250 | Plastic | 1.639 | 23.5 | −4.93 |
| 7 | | 1.382 | ASP | 0.529 | | | | |
| 8 | Lens 4 | −4.734 | ASP | 1.469 | Plastic | 1.544 | 56.0 | 2.15 |
| 9 | | −1.039 | ASP | 0.060 | | | | |
| 10 | Lens 5 | 2.805 | ASP | 0.571 | Plastic | 1.639 | 23.5 | −2.48 |
| 11 | | 0.932 | ASP | 0.600 | | | | |
| 12 | IR Cut Filter | Plano | | 0.300 | Glass | 1.517 | 64.2 | — |
| 13 | | Plano | | 0.661 | | | | |
| 14 | Image Surface | Plano | | — | | | | |

Note:
Reference wavelength is d-line 587.6 nm

TABLE 28

Aspheric Coefficients

| Surface # | 1 | 2 | 4 | 5 | 6 |
|---|---|---|---|---|---|
| k = | 0.0000E+00 | −2.0928E+01 | 4.5068E−01 | −5.0755E+00 | −2.0501E+01 |
| A4 = | 1.7636E−01 | 2.7826E−01 | 5.9835E−03 | −8.8476E−02 | −1.0625E−01 |
| A6 = | −1.1363E−01 | −1.4107E−01 | −3.8477E−02 | 5.4768E−03 | 2.4549E−02 |
| A8 = | 6.3921E−02 | 1.0537E−01 | 4.4414E−02 | −1.5283E−03 | −9.1951E−03 |
| A10 = | −2.4325E−02 | −2.6030E−02 | −6.0448E−02 | −3.1948E−03 | −5.6352E−03 |
| A12 = | 4.8655E−03 | −4.4142E−03 |  | −6.1503E−03 | −3.9355E−04 |
| A14 = | −3.9442E−04 |  |  |  |  |

| Surface # | 7 | 8 | 9 | 10 | 11 |
|---|---|---|---|---|---|
| k = | −6.3779E+00 | −8.7039E+01 | −2.3585E+00 | −4.1053E+01 | −5.1547E+00 |
| A4 = | −5.7853E−02 | −1.9317E−02 | 2.7674E−02 | −3.2548E−02 | −6.2361E−02 |
| A6 = | 4.5602E−02 | 4.3063E−02 | −5.1939E−02 | −3.9789E−02 | 1.8414E−02 |
| A8 = | −2.7519E−02 | −3.2050E−02 | 1.8852E−02 | 2.3636E−02 | −4.1885E−03 |
| A10 = | 9.1740E−03 | 1.4488E−02 | 6.0939E−03 | −5.5570E−03 | 5.7681E−04 |
| A12 = | −1.2908E−03 | −3.3206E−03 | −7.4859E−03 | −4.1022E−04 | −4.6431E−05 |
| A14 = |  | 2.6522E−04 | 2.3498E−03 | 3.6907E−04 | 1.8024E−06 |
| A16 = |  |  | −2.4506E−04 | −3.8896E−05 | −1.3664E−08 |

In the 10th embodiment, the equation of the aspheric surface profiles of the aforementioned lens elements is the same as the equation of the 1st embodiment. Also, the definitions of these parameters shown in TABLE 29 below are the same as those stated in the 1st embodiment with corresponding values for the 8th embodiment, so an explanation in this regard will not be provided again.

Moreover, these parameters can be calculated from TABLE 27 and TABLE 28 and satisfy the conditions stated in TABLE 29.

TABLE 29

10th Embodiment

| | | | |
|---|---|---|---|
| f [mm] | 2.82 | (R5 + R6)/(R5 − R6) | 3.20 |
| Fno | 2.10 | \|Sag41\|/CT4 | 0.04 |
| HFOV [deg.] | 53.4 | Y11/Y52 | 0.60 |
| V5 | 23.5 | Y52/f | 0.96 |
| T12/(T23 + T34 + T45) | 1.45 | f1/\|f3\| | −1.30 |
| \|R1/R2\| | 2.35 | f1/f | −2.27 |
| (R3 + R4)/(R3 − R4) | 0.42 | | |

The foregoing description, for purpose of explanation, has been described with reference to specific embodiments. It is to be noted that TABLES 1-29 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising, in order from an object side to an image side:
 a first lens element having negative refractive power;
 a second lens element with positive refractive power having an image-side surface being convex thereof;
 a third lens element;
 a fourth lens element with positive refractive power having an object-side surface being concave and an image-side surface being convex thereof; and
 a fifth lens element with negative refractive power having an image-side surface being concave, at least one convex shape on the image-side surface in an off-axial region, and both of object-side and the image-side surfaces thereof being aspheric;
 wherein the imaging lens assembly has a total of five lens elements, an axial distance between the first lens element and the second lens element is the largest among respective axial distances between every two adjacent lens elements of the first lens element, the second lens element, the third lens element, the fourth lens element, and the fifth lens element; wherein a focal length of the first lens element is f1, a focal length of the third lens element is f3, a curvature radius of an object-side surface of the second lens element is R3, a curvature radius of the image-side surface of the second lens element is R4, a curvature radius of an object-side surface of the first lens element is R1, a curvature radius of an image-side surface of the first lens element is R2, and the following conditions are satisfied:

$$-2.40 < f1/|f3| < 0;$$

$$0.65 \leq (R3+R4)/(R3-R4);$$

$$2.30 < |R1/R2|.$$

2. The imaging lens assembly of claim 1, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following condition is satisfied:

$$1.25 < T12/(T23+T34+T45) < 5.0.$$

3. The imaging lens assembly of claim 1, wherein the focal length of the first lens element is f1, the focal length of the third lens element is f3, and the following condition is satisfied:

$$1.40 < f1/|f3| < 0.$$

4. The imaging lens assembly of claim 3, wherein the focal length of the first lens element is f1, the focal length of the third lens element is f3, and the following condition is satisfied:

$-1.10 < f1/|f3| < 0.$

5. The imaging lens assembly of claim 1, wherein the curvature radius of the object-side surface of the second lens element is R3, the curvature radius of the image-side surface of the second lens element is R4, and the following condition is satisfied:

$0.65 \leq (R3+R4)/(R3-R4) < 2.0.$

6. The imaging lens assembly of claim 1, wherein the fifth lens element has an object-side surface being convex thereof.

7. The imaging lens assembly of claim 1, wherein a curvature radius of the object-side surface of the third lens element is R5, a curvature radius of the image-side surface of the third lens element is R6, and the following condition is satisfied:

$1.50 < (R5+R6)/(R5-R6).$

8. The imaging lens assembly of claim 1, wherein the third lens element has an object-side surface being convex and an image-side surface being concave thereof and each of the surfaces of the third lens element has at least one inflection point thereof.

9. The imaging lens assembly of claim 1, wherein a distance in parallel with an optical axis from an axial vertex on the object-side surface of the fourth lens element to a maximum effective diameter position on the object-side surface of the fourth lens element is Sag41, a central thickness of the fourth lens element is CT4, and the following condition is satisfied:

$|Sag41|/CT4 < 0.15.$

10. The imaging lens assembly of claim 1, wherein the focal length of the first lens element is f1, a focal length of the second lens element is f2, the focal length of the third lens element is f3, and the following condition is satisfied:

$f3 < f1 < f2.$

11. The imaging lens assembly of claim 1, wherein an Abbe number of the fifth lens element is V5, and the following condition is satisfied:

$10 < V5 < 32.$

12. The imaging lens assembly of claim 11, wherein a vertical distance between a maximum effective diameter position on the image-side surface of the fifth lens element and an optical axis is Y52, a focal length of the imaging lens assembly is f, and the following condition is satisfied:

$0.85 < Y52/f.$

13. The imaging lens assembly of claim 11, wherein a vertical distance between a maximum effective diameter position on the object-side surface of the first lens element and an optical axis is Y11, a vertical distance between a maximum effective diameter position on the image-side surface of the fifth lens element and the optical axis is Y52, and the following condition is satisfied:

$0.55 < Y11/Y52 < 1.20.$

14. An image capturing apparatus, comprising the imaging lens assembly of claim 1 and an image sensor disposed on an image surface of the imaging lens assembly.

15. An electronic device, comprising the image capturing apparatus of claim 14.

16. An imaging lens assembly, comprising, in order from an object side to an image side:
a first lens element having negative refractive power;
a second lens element with positive refractive power having an image-side surface being convex thereof;
a third lens element with negative refractive power having an object-side surface being convex thereof;
a fourth lens element with positive refractive power having an object-side surface being concave and an image-side surface being convex thereof; and
a fifth lens element with negative refractive power having an image-side surface being concave, at least one convex shape on the image-side surface in an off-axial region, and both of object-side and the image-side surfaces thereof being aspheric;
wherein the imaging lens assembly has a total of five lens elements;
wherein a focal length of the first lens element is f1, a focal length of the third lens element is f3, a curvature radius of an object-side surface of the first lens element is R1, a curvature radius of an image-side surface of the first lens element is R2, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

$-2.40 < f1/|f3| < 0;$ $2.30 < |R1/R2|;$ $1.96 \leq T12/(T23+T34+T45) \leq 3.35.$ 17. The imaging lens assembly of claim 16, wherein a vertical distance between a maximum effective diameter position on the image-side surface of the fifth lens element and an optical axis is Y52, a focal length of the imaging lens assembly is f, and the following condition is satisfied:

$0.80 < Y52/f.$

18. The imaging lens assembly of claim 16, wherein the third lens element has an image-side surface being concave thereof and each of the surfaces of the third lens element has at least one inflection point thereof.

19. The imaging lens assembly of claim 16, wherein the focal length of the first lens element is f1, the focal length of the third lens element is f3, and the following condition is satisfied:

$-1.10 < f1/|f3|.$

20. The imaging lens assembly of claim 16, wherein the curvature radius of an object-side surface of the first lens element is R1, the curvature radius of an image-side surface of the first lens element is R2, and the following condition is satisfied:

$4.0 < |R1/R2|.$

21. The imaging lens assembly of claim 16, wherein the focal length of the first lens element is f1, a focal length of the imaging lens assembly is f, and the following condition is satisfied:

$-3.5 < f1/f < 0.$

22. The imaging lens assembly of claim 16, wherein an Abbe number of the fifth lens element is V5, and the following condition is satisfied:

$$10 < V5 < 32.$$

23. The imaging lens assembly of claim 16, wherein a curvature radius of the object-side surface of the third lens element is R5, a curvature radius of the image-side surface of the third lens element is R6, and the following condition is satisfied:

$$1.50 < (R5+R6)/(R5-R6).$$

24. The imaging lens assembly of claim 16, wherein the fifth lens element has the object-side surface being convex.

25. An image capturing apparatus, comprising the imaging lens assembly of claim 16 and an image sensor disposed on an image surface of the imaging lens assembly.

26. An electronic device, comprising the image capturing apparatus of claim 25.

* * * * *